United States Patent
Goyal et al.

(10) Patent No.: US 11,153,038 B2
(45) Date of Patent: Oct. 19, 2021

(54) MIC RECOVERY OF BR/EDR LINKS

(71) Applicant: QUALCOMM Incorporated, San Diego, CA (US)

(72) Inventors: Giriraj Goyal, Bangalore (IN); Vishal Agarwal, Ramnagar (IN)

(73) Assignee: QUALCOMM INCORPORATED, San Diego, CA (US)

( * ) Notice: Subject to any disclaimer, the term of this patent is extended or adjusted under 35 U.S.C. 154(b) by 26 days.

(21) Appl. No.: 16/693,083

(22) Filed: Nov. 22, 2019

(65) Prior Publication Data

US 2021/0160009 A1 May 27, 2021

(51) Int. Cl.
| | |
|---|---|
| *H04L 1/00* | (2006.01) |
| *H04L 1/08* | (2006.01) |
| *H04L 5/00* | (2006.01) |
| *H04L 12/823* | (2013.01) |
| *H04L 29/06* | (2006.01) |
| *H04W 4/80* | (2018.01) |
| *H04W 84/18* | (2009.01) |

(52) U.S. Cl.
CPC .......... *H04L 1/0061* (2013.01); *H04L 1/0054* (2013.01); *H04L 1/08* (2013.01); *H04L 5/0055* (2013.01); *H04L 47/32* (2013.01); *H04L 63/04* (2013.01); *H04W 4/80* (2018.02); *H04W 84/18* (2013.01)

(58) Field of Classification Search
None
See application file for complete search history.

(56) References Cited

U.S. PATENT DOCUMENTS

| | | | |
|---|---|---|---|
| 2011/0022916 A1* | 1/2011 | Desai | H04L 9/0662 714/748 |
| 2014/0208152 A1* | 7/2014 | Magoshi | H04L 47/34 714/4.1 |
| 2016/0021066 A1* | 1/2016 | Parvathaneni | H04W 12/033 713/171 |
| 2016/0210189 A1 | 7/2016 | Xhafa et al. | |
| 2017/0156102 A1* | 6/2017 | Singh | H04W 40/246 |
| 2018/0115517 A1* | 4/2018 | Rotvoid | H04L 63/061 |
| 2020/0059324 A1* | 2/2020 | Martin | H04L 1/1874 |

OTHER PUBLICATIONS

International Search Report and Written Opinion—PCT/US2020/057445—ISA/EPO—dated Feb. 17, 2021.

* cited by examiner

*Primary Examiner* — Otis L Thompson, Jr.
(74) *Attorney, Agent, or Firm* — Kevin T. Cheatham

(57) ABSTRACT

Apparatus, methods, and computer-readable media for an error correction technique that identifies transmission errors and corrective actions to maintain a link are disclosed herein. An example method of wireless communications includes receiving a first PDU comprising at least one of a SEQN bit or a packet counter value. The example method includes determining whether a value of the SEQN bit of the received first PDU is an expected SEQN or an unexpected SEQN. The example method includes calculating a MIC of the received first PDU. The example method includes determining whether the received first PDU is a re-transmission of a previous PDU or the received first PDU comprising errors. The example method includes transmitting an ACK or a NACK in response to the determination of whether the first PDU is the re-transmission of the previous PDU or the first PDU comprising errors.

27 Claims, 15 Drawing Sheets

MIC RECOVERY OF BR/EDR LINKS

BACKGROUND

Field

The present disclosure relates generally to communication systems, and more particularly, to a message integrity check recovery of Basic Rate/Enhanced Data Rate links.

Background

A wireless personal area network (WPAN) is a personal, short-range wireless network for interconnecting devices centered around a specific distance from a user. WPANs have gained popularity because of the flexibility and convenience in connectivity that WPANs provide. WPANs, such as those based on short-range communication protocols (e.g., a Bluetooth® (BT) protocol, a Bluetooth® Low Energy (BLE) protocol, a Zigbee® protocol, etc.), provide wireless connectivity to peripheral devices by providing wireless links that allow connectivity within a specific distance (e.g., 5 meters, 10 meter, 20 meters, 100 meters, etc.).

BT is a short-range wireless communication protocol that may support a WPAN between a wireless device (e.g., a master device) and at least one peripheral device (e.g., a slave device). There are two forms of BT wireless technology systems: Basic Rate (BR) and Low Energy (LE). Both systems include device discovery, connection establishment, and connection mechanisms. The BR system includes optional Enhanced Data Rate (EDR), Alternate Media Access Control (MAC), and Physical (PHY) layer extensions. The BR system offers synchronous and asynchronous connections with data rates of 721.2 kbps for BR, 2.1 Mbps for EDR, and high speed operation up to 54 Mbps with 802.11 AMP. The LE system includes features designed to enable products that have lower current consumption than BR/EDR. A master BR/EDR device may communicate with a maximum of seven slaves in a wireless network (e.g., piconet).

In noisy or poor RF environments, BR/EDR links may become unreliable. To counteract this, BT provides for error correction techniques that may allow a receiving device (e.g., a slave device) to detect and/or correct errors in the transmitted data packets. For example, when the receiving device detects errors in the received data packet, the receiving device may transmit a negative acknowledgement (NACK) to the transmitting device (e.g., master device) to indicate that a particular data packet was not properly received. The transmitting device may retransmit the particular data packet in response to the NACK until the receiving device transmits an acknowledgement (ACK) indicating that the particular data packet was properly received. However, in some instances, the transmitted data packet may become corrupted during transmission, such that the data packet received by the receiving device (e.g., slave device) is not what was originally transmitted by the transmitting device (e.g., master device). In such instances, the receiving device will continually detect errors and transmit repeated NACKs, which may lead to link loss. Thus, there exists a need for an error correction technique that compensates for transmission errors and maintains the link.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Various standards and protocols for use with a WPAN, such as BT and/or BLE, may provide for data from one device (e.g., a master device) to be output on another device (e.g., a slave device). For example, a smartphone may be coupled with a headset over a short-range wireless communications link and may send audio data to the headset to be played through the speakers of the headset.

In some scenarios, the conditions present while the master device is sending data packets to the slave device may change. For example, the channel conditions associated with the short-range wireless communications link may degrade. To counteract the degradation in channel conditions, BT provides for error correction techniques that may allow a receiving device (e.g., a slave device) to detect and/or correct errors in the transmitted data packets. For example, certain packet types may include forward error correcting (FEC) coding to allow error correction by the receiving device, some packet types include a cyclic redundancy error check (CRC), while some packet types may include a message integrity check (MIC) to validate the integrity of the data, and a packet counter to avoid replay attacks. A replay attack may occur when a third party captures a transmitted data packet and replays or retransmits a modified version of the captured data packet in an attempt to gain access to the device intended to receive the originally transmitted data packet.

Error correction failures may result in the receiving device (e.g., a slave device) transmitting a NACK to the source device (e.g., a master device), such that the source device retransmits the original version of the data packet that was transmitted. BR/EDR links may be susceptible to MIC errors when the receiving device does not properly decrypt the data packet encrypted by the source device. The transmitted data packet may become corrupted during transmission such that the receiving device may not be able to validate the integrity of the data using MIC, and encounter repeated MIC errors. The repeated MIC errors may lead to link loss.

There exists a need for a BT error correction technique to identify transmission errors and take corrective actions to maintain the link. More particularly there is a need for a mechanism for a receiving device to recover from repeated MIC errors which may occur because of bit flip errors during a transmission.

The present disclosure provides an error correction technique that allows a receiving device to identify data packet errors that may occur during transmission of the data packet, and to perform corrective actions to maintain the communication link with the source device. The receiving device may be configured to examine one or more portions of a data packet to identify errors in the data packet that occur during transmission. The techniques therefore provide error correction for the packet, including packet portions not protected by an imbedded error correction mechanism. As a result, data communications over noisy communication mediums may be more reliable as the techniques may reduce error rates and increase link stability between peer devices, such as the receiving device and the source device.

In an aspect of the disclosure, a method, a computer-readable medium, and an apparatus are provided. The apparatus may receive a first packet data unit (PDU) comprising at least one of a sequence number (SEQN) bit or a packet counter value. The apparatus may determine whether a value of the SEQN bit of the received first PDU is an expected SEQN or an unexpected SEQN. The apparatus may calculate, based on the packet counter value, a MIC of the received first PDU. The apparatus may determine, based on the determination that the value of the SEQN bit is the unexpected SEQN, whether the received first PDU is a re-transmission of a previous PDU or the received first PDU comprising errors. The apparatus may transmit an ACK or a NACK in response to the determination of whether the first PDU is the re-transmission of the previous PDU or the first PDU comprising errors.

To the accomplishment of the foregoing and related ends, the one or more aspects include the features hereinafter fully described and particularly pointed out in the claims. The following description and the annexed drawings set forth in detail certain illustrative features of the one or more aspects. The illustrative features are indicative, however, of but a few of the various ways in which the principles of various aspects may be employed, and this description is intended to include all such aspects and their equivalents.

DETAILED DESCRIPTION

Figure 1:
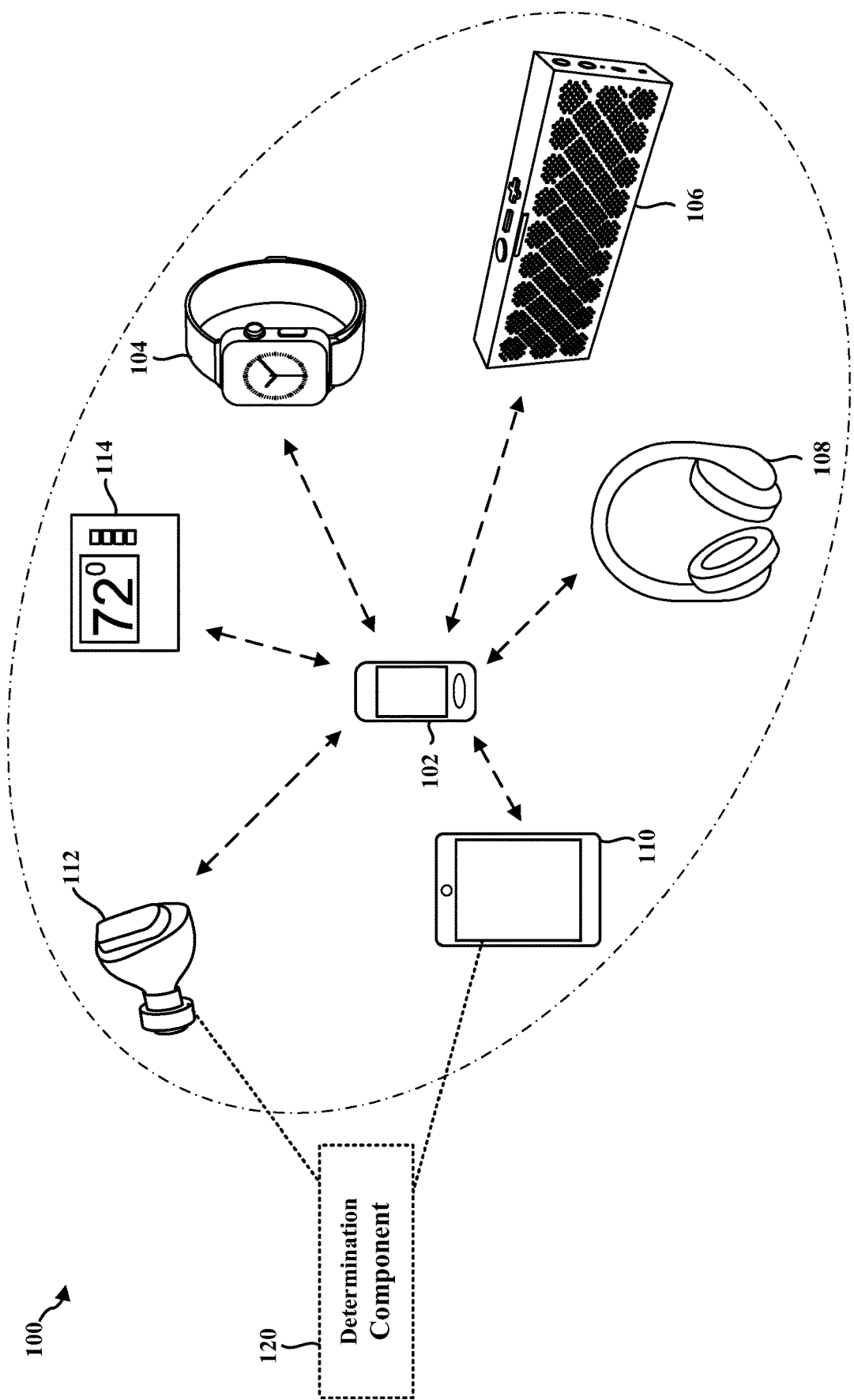
FIG. 1 is a diagram illustrating an example of a WPAN in accordance with certain aspects of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 illustrates an example WPAN 100 in accordance with certain aspects of the disclosure. Within the WPAN 100, a wireless device 102 may use a communications link 116 to communicate with one or more peripheral devices 104, 106, 108, 110, 112, 114 using a short-range wireless communications protocol. The short-range wireless communications protocol may include a BT protocol or a BLE protocol.

Examples of the wireless device 102 may include a cellular phone, a smart phone, a session initiation protocol (SIP) phone, a mobile station (STA), a laptop, a personal computer (PC), a desktop computer, a personal digital assistant (PDA), a satellite radio, a global positioning system, a multimedia device, a video device, a digital audio player (e.g., MP3 player), a camera, a game console, a tablet, a smart device, a wearable device (e.g., smart watch, wireless headphones, etc.), a vehicle, an electric meter, a gas pump, a toaster, a thermostat, a hearing aid, a blood glucose on-body unit, an Internet-of-Things (IoT) device, or any other similarly functioning device.

Examples of the one or more peripheral devices 104, 106, 108, 110, 112, 114 may include a cellular phone, a smart phone, a SIP phone, a STA, a laptop, a PC, a desktop computer, a PDA, a satellite radio, a global positioning system, a multimedia device, a video device, a digital audio player (e.g., MP3 player), a camera, a game console, a tablet, a smart device, a wearable device (e.g., smart watch, wireless headphones, etc.), a vehicle, an electric meter, a gas pump, a toaster, a thermostat, a hearing aid, a blood glucose on-body unit, an IoT device, or any other similarly functioning device. Although the wireless device 102 is illustrated in communication with six peripheral devices 104, 106, 108, 110, 112, 114 in the WPAN 100, the wireless device 102 may communicate with more or fewer than six peripheral devices within the WPAN 100 without departing from the scope of the present disclosure.

A device (e.g., wireless device 102) implementing the BT protocol may operate according to one radio mode, such as BR/EDR, and a device implementing the BLE protocol may operate according to a BLE radio mode. In some aspects, a device (e.g., wireless device 102) may be configured with dual radio modes, and may be able to operate according to the BR/EDR mode or the BLE mode, based on the type of short-range wireless communication in which the device may engage.

For example, the device may operate according to the BR/EDR mode for continuous streaming of data (e.g., audio data), for broadcast networks, for mesh networks, and/or for some other applications in which a relatively higher data rate may be more suitable. However, the device may operate according to the BLE mode for short burst data transmissions and/or for some other applications in which power conservation may be desirable (e.g., when a relatively lower data rate may be acceptable).

A short-range wireless communications protocol (e.g., BT and/or BLE) may include and/or may use one or more other communications protocols, e.g., for establishing and maintaining communications links. As illustrated, the wireless device 102 may establish a communications link 116 with the peripheral device 104, 106, 108, 110, 112, 114, according to at least one communications protocol for short-range wireless communications.

The communications link 116 may include a link that adheres to a protocol included and/or for use with BT or BLE. In one aspect, the communications link 116 may include an asynchronous connection-less (ACL) link. With ACL, the wireless device 102 may connect (or "pair" in the terminology of the BT specification) with a second device (e.g., the peripheral device 112). The connection may be asynchronous in that the two devices may not need to synchronize, time-wise, data communications between each other to permit communication of data packets via the communications link 116.

In some aspects, the communications link 116 may include an Advanced Audio Distribution Profile (A2DP) link. An A2DP link may provide for a point-to-point link between a source device (e.g., the wireless device 102) and a sink device (e.g., the peripheral device 112). With an A2DP link, data packets including audio may be transmitted over an ACL data channel, and other information (e.g., for controlling the audio stream) may be transmitted over a separate control channel. The data packets (e.g., including audio) may occur non-periodically.

The wireless device 102 may include logic, circuitry, interfaces, processors, and/or code that may be used to communicate with one or more peripheral devices 104, 106, 108, 110, 112, 114 using the BLE protocol or the modified BLE protocol. The wireless device 102 may operate as an initiator to request establishment of a link layer (LL) connection with an intended peripheral device 104, 106, 108, 110, 112, 114.

A LL in the BLE protocol stack and/or modified BLE protocol stack (not shown) may provide, as compared to BT, ultra-low power idle mode operation, simple device discovery and more reliable point-to-multipoint data transfer with advanced power-save and encryption functionalities. After a requested LL connection is established, the wireless device 102 may become a master device and the intended peripheral device 104, 106, 108, 110, 112, 114 may become a slave device for the established LL connection. As a master device, the wireless device 102 may be capable of supporting multiple LL connections at a time with various peripheral devices 104, 106, 108, 110, 112, 114 (slave devices). The wireless device 102 (master device) may be operable to manage various aspects of data packet communication over a LL connection with an associated peripheral device 104, 106, 108, 110, 112, 114 (slave device). For example, the wireless device 102 may be operable to determine an operation schedule for the LL connection with a peripheral device 104, 106, 108, 110, 112, 114. The wireless device 102 may be operable to initiate a LL protocol data unit (PDU) exchange sequence over the LL connection. LL connections may be configured to run periodic connection events on dedicated data channels. The exchange of LL data PDU transmissions between the wireless device 102 and one or more of the peripheral devices 104, 106, 108, 110, 112, 114 may take place within connection events.

In certain configurations, the wireless device 102 may be configured to transmit the first LL data PDU of each connection event to an intended peripheral device 104, 106, 108, 110, 112, 114. In certain other configurations, the wireless device 102 may utilize a polling scheme to poll the intended peripheral device 104, 106, 108, 110, 112, 114 for a LL data PDU transmission during a connection event. The intended peripheral device 104, 106, 108, 110, 112, 114 may transmit a LL data PDU upon receipt of a LL data packet PDU from the wireless device 102. In certain other configurations, a peripheral device 104, 106, 108, 110, 112, 114 may transmit a LL data PDU to the wireless device 102 without first receiving a LL data PDU from the wireless device 102.

Referring again to FIG. 1, in certain aspects, the peripheral device (e.g., slave device) may be configured to identify data packet errors and perform corrective actions to maintain the communications link with the source device (e.g., master device). For example, in FIG. 1, the peripheral device may include a determination component 120 configured to determine whether a first received PDU is a re-transmission of a previously received PDU or whether the received first PDU comprises errors. The determination component 120 may be configured to determine whether the first received PDU is a re-transmission or comprises errors, based on a determination that a value of a SEQN bit is an unexpected SEQN. In some aspects, different corrective actions may occur when the first PDU is a re-transmission or when the first PDU comprises errors.

Figure 2:
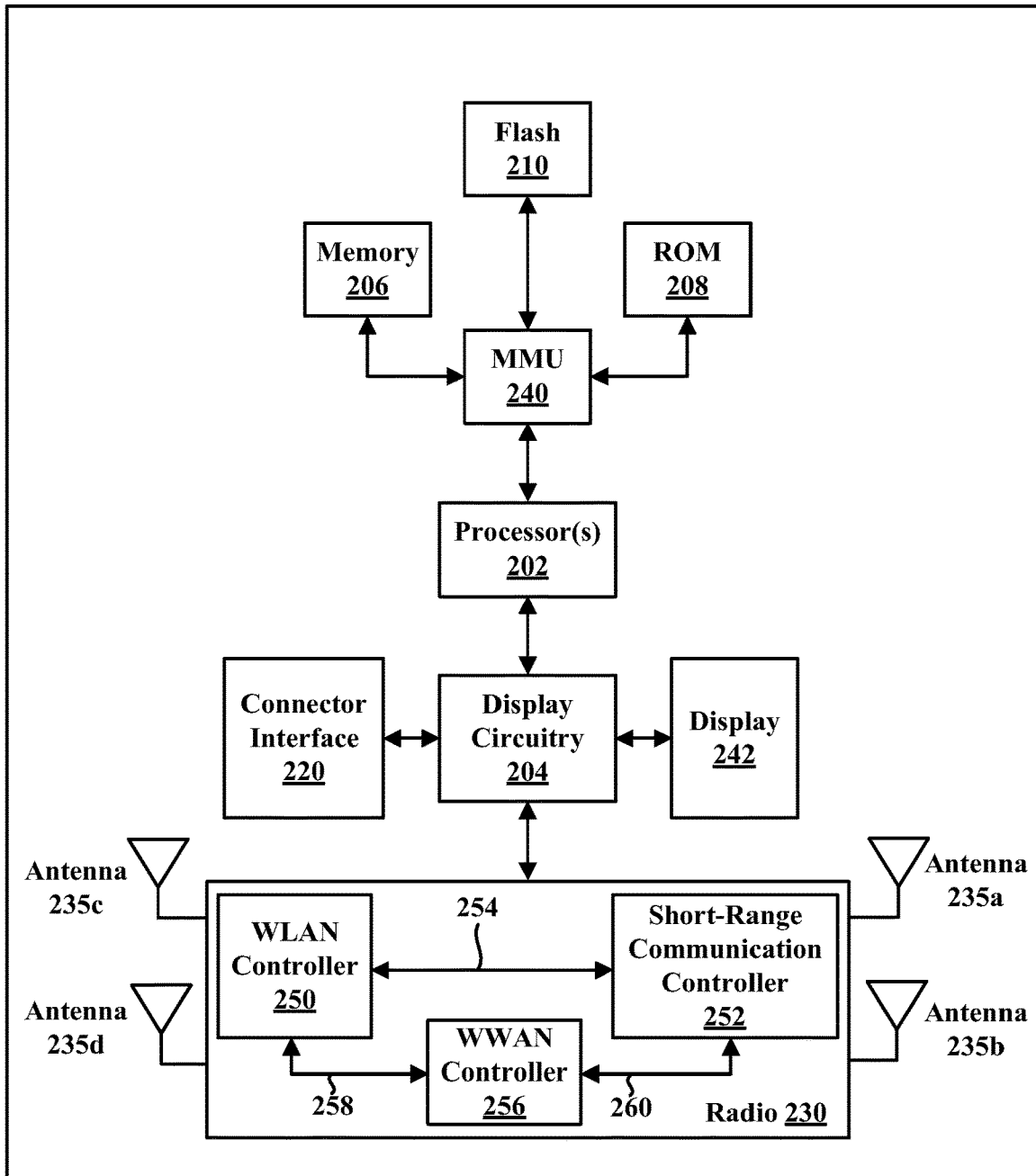
FIG. 2 is block diagram of a wireless device in accordance with certain aspects of the disclosure.

FIG. 2 is block diagram of a wireless device 200 in accordance with certain aspects of the disclosure. The wireless device 200 may correspond to, e.g., the wireless device 102, and/or one of peripheral devices 104, 106, 108, 110, 112, 114 described above in connection with FIG. 1. In certain aspects, the wireless device 200 may be a BT enabled device.

As shown in FIG. 2, the wireless device 200 may include a processing element, such as processor(s) 202, which may execute program instructions for the wireless device 200. The wireless device 200 may also include display circuitry 204 which may perform graphics processing and provide display signals to the display 242. The processor(s) 202 may also be coupled to memory management unit (MMU) 240, which may be configured to receive addresses from the processor(s) 202 and translate the addresses to address locations in memory (e.g., memory 206, ROM 208, Flash memory 210) and/or to address locations in other circuits or devices, such as the display circuitry 204, radio 230, connector interface 220, and/or display 242. The MMU 240 may be configured to perform memory protection and page table translation or set up. In some embodiments, the MMU 240 may be included as a portion of the processor(s) 202.

As shown, the processor(s) 202 may be coupled to various other circuits of the wireless device 200. For example, the wireless device 200 may include various types of memory, a connector interface 220 (e.g., for coupling to the computer system), the display 242, and wireless communication circuitry (e.g., for Wi-Fi, BT, BLE, cellular, etc.). The wireless device 200 may include a plurality of antennas 235a, 235b, 235c, 235d, for performing wireless communication with, e.g., wireless devices in a WPAN.

In certain aspects, the wireless device 200 may include hardware and software components (a processing element) configured to identify data packet errors and perform corrective actions to maintain the link with the source device, e.g., using the techniques as described in the present disclosure. The wireless device 200 may also comprise BT and/or BLE firmware or other hardware/software for controlling BT and/or BLE operations.

The wireless device 200 may be configured to implement part or all of the techniques described below in connection with any of FIGS. 3-18, e.g., by executing program instructions stored on a memory medium (e.g., a non-transitory computer-readable memory medium) and/or through hardware or firmware operation. In other embodiments, the techniques described below in connection with any of FIGS. 3-18 may be at least partially implemented by a programmable hardware element, such as an field programmable gate array (FPGA), and/or an application specific integrated circuit (ASIC).

In certain aspects, radio 230 may include separate controllers configured to control communications for various respective radio access technology (RAT) protocols. For example, as shown in FIG. 2, radio 230 may include a WLAN controller 250 configured to control WLAN communications, a short-range communication controller 252 configured to control short-range communications, and a WWAN controller 256 configured to control WWAN communications. In certain aspects, the wireless device 200 may store and execute a WLAN software driver for controlling WLAN operations performed by the WLAN controller 250, a short-range communication software driver for controlling short-range communication operations performed by the short-range communication controller 252, and/or a WWAN software driver for controlling WWAN operations performed by the WWAN controller 256.

In certain implementations, a first coexistence interface 254 (e.g., a wired interface) may be used for sending information between the WLAN controller 250 and the short-range communication controller 252. In certain other implementations, a second coexistence interface 258 may be used for sending information between the WLAN controller 250 and the WWAN controller 256. In certain other implementations, a third coexistence interface 260 may be used to send information between the short-range communication controller 252 and the WWAN controller 256.

In some aspects, one or more of the WLAN controller 250, the short-range communication controller 252, and/or the WWAN controller 256 may be implemented as hardware, software, firmware or some combination thereof.

In certain configurations, the WLAN controller 250 may be configured to communicate with a second device in a WPAN using a WLAN link using all of the antennas 235a, 235b, 235c, 235d. In certain other configurations, the short-range communication controller 252 may be configured to communicate with at least one second device in a WPAN using one or more of the antennas 235a, 235b, 235c, 235d. In certain other configurations, the WWAN controller 256 may be configured to communicate with a second device in a WPAN using all of the antennas 235a, 235b, 235c, 235d. The short-range communication controller 252 may be configured to identify data packet errors and perform corrective actions to maintain the link with the source device.

Figure 3:
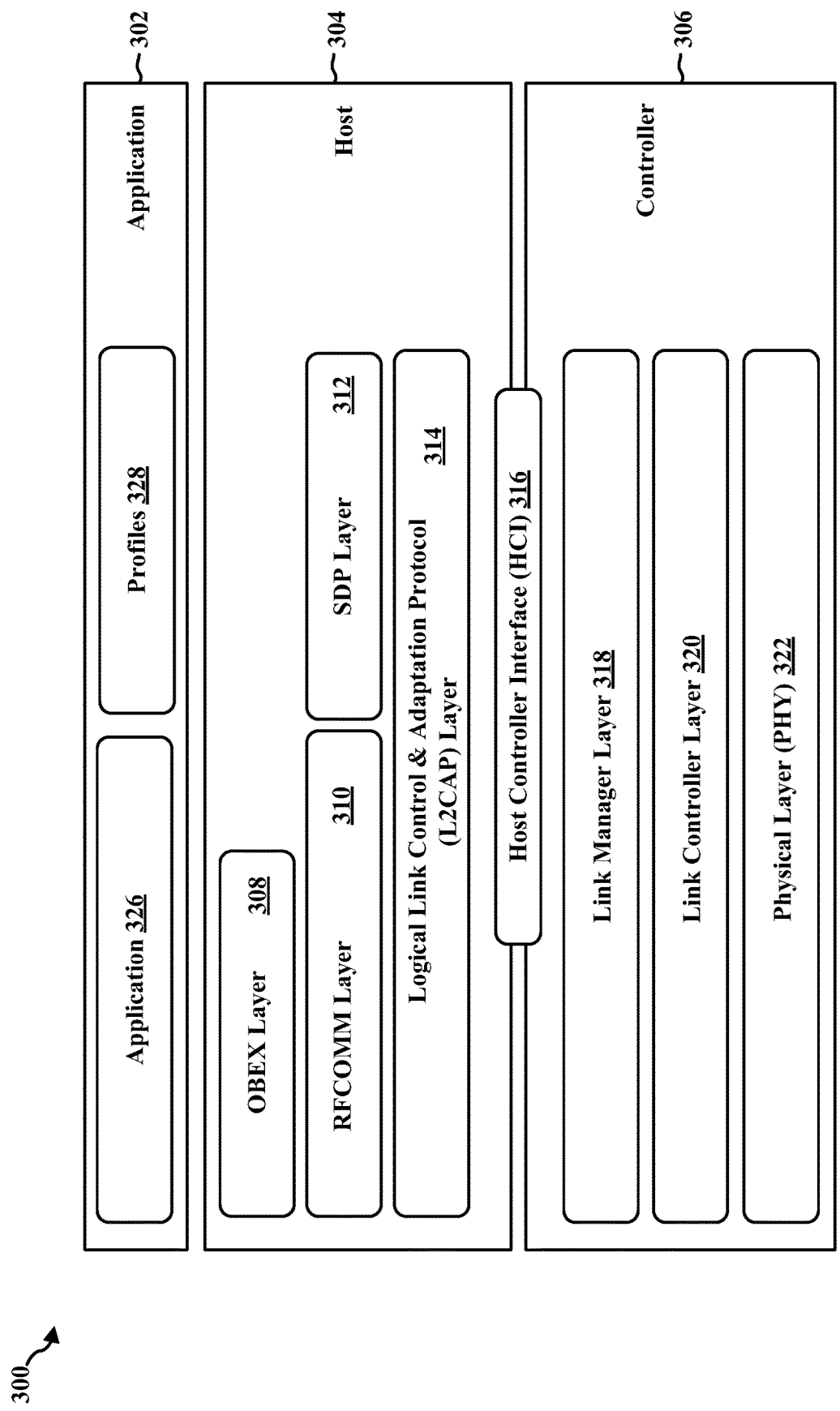
FIG. 3 is a diagram illustrating a BT protocol stack in accordance with certain aspects of the disclosure.

FIG. 3 illustrates a BT protocol stack 300 that may be implemented in a wireless device in accordance with certain aspects of the present disclosure. For example, the BT protocol stack 300 may be implemented by, e.g., one or more of processor(s) 202, memory 206, Flash memory 210, ROM 208, the radio 230, and/or the short-range communication controller 252 illustrated in FIG. 2.

Referring to FIG. 3, the BT protocol stack 300 may be organized into lower layer(s), a middle layer(s), and upper layer(s). The lower layer(s) of the BT protocol stack 300 may include a controller 306, which may be used for, inter alia, hardware interface management, link establishment, and link management. The middle layer(s) of the BT protocol stack 300 may include a host 304, which may be used for, inter alfa, application (layer) interface management to allow an application (layer) to access short-range wireless communications. The higher layer(s) of the BT protocol stack 300 may include an application 302, which may include one or more applications and one or more profiles that allow the one or more applications to use BT communications.

The controller 306 may include a physical (PHY) layer 322. The PHY layer 322 may include, for example, a radio and/or a baseband processor. In some aspects, the PHY layer 322 may define the mechanism for transmitting a bit stream over a physical link or channel that connects BT devices. The bit stream may be grouped into code words or symbols, and converted to a data packet that is transmitted over a wireless transmission medium. The PHY layer 322 may provide an electrical, mechanical, and/or procedural interface to the wireless transmission medium. The PHY layer 322 may be responsible for modulation and demodulation of data into radio frequency (RF) signals for transmission over the air. The PHY layer 322 may describe the physical characteristics of a wireless device's receiver/transmitter. The physical characteristics may include modulation characteristics, radio frequency tolerance, sensitivity level, etc.

The controller 306 may further include a link controller layer 320. The link controller layer 320 may be responsible for properly formatting data for providing to and obtaining from the PHY layer 322. Further, the link controller layer 320 may perform synchronization of links (e.g., logical links including ACL links, A2DP links, SCO links, eSCO links, ISO links, etc.). The link controller layer 320 may be responsible for executing commands and instructions issued by a link manager layer 318, including establishing and maintaining links instructed by the link manager layer 318.

The link manager layer 318 may translate host controller interface (HCI) 316 commands into controller-level operations (e.g., baseband-level operations). The link manager layer 318 may be responsible for establishing and configuring links and managing power-change requests, among other tasks. Each type of logical link (e.g., ACL links, A2DP links, SCO links, eSCO links, ISO links, etc.) may be associated with a specific packet type. For example, an SCO link may provide reserved channel bandwidth for communication between a master device and a slave device, and support regular, periodic exchange of data packets with no retransmissions. An eSCO link may provide reserved channel bandwidth for communication between a master device and a slave device, and support regular, periodic exchange of data packets with retransmissions. An ACL link may exist between a master device and a slave device from the beginning of establishment of a connection between the master device and the slave device, and the data packets for ACL links may include encoding information in addition to a payload.

The link manager layer 318 may communicate with the host stack 304 through a host controller interface (HCI) 316—e.g., the link manager layer 318 may translate HCI 316 commands into controller-level operations (e.g., baseband-level operations). The HCI 316 may act as a boundary between the lower layers (e.g., the controller 306) of the BT protocol stack 300 and the other layers of the BT protocol stack (e.g., the host 304 and the application 302). The BT specification may define a standard HCI to support BT systems that are implemented across two separate processors. For example, a BT system on a computer might use a processor of a BT component to implement the lower layers of the stack (e.g., the PHY layer 322, the link controller layer 320, and/or the link manager layer 318). The BT system might then use the BT system's processor to implement the other layers (e.g., the host 304 and the application 302). In some aspects, however, the BT system may be implemented on a same processor to implement the other layers (e.g., the host 304 and controller 306), and such a BT system may be referred to as "hostless."

The host 304 may include at least a Logical Link Control and Adaptation Protocol (L2CAP) layer 314, a service discovery protocol (SDP) layer 312, a radio frequency communication (RFCOMM) layer 310, and an object exchange (OBEX) layer 308. The L2CAP layer 314 is implemented above the HCI 316, and may communicate through the HCI 316. The L2CAP layer 314 may be primarily responsible for establishing connections across some existing links (e.g., logical links, including ACL links) and/or requesting establishment of some links (e.g., logical links, including ACL links) if such links do not already exist. Further, the L2CAP layer 314 may implement multiplexing between different higher-layer protocols, such as SDP protocols and RFCOMM protocols, which may to allow different applications to use a single link (e.g., a logical link, including an ACL link). In addition, the L2CAP layer 314 may repackage data packets received from higher layers into a format expected by lower layers. The L2CAP layer 314 may employ the concept of channels to keep track of where data packets originate and where data packets should go. A channel may be a logical representation of the data flow or stream between the L2CAP layer 314 at a transmitting device (e.g., a master device) and another L2CAP layer 314 at a receiving device (e.g., a slave device).

The SDP layer 312 may define actions for both servers and clients of BT services. The BT specification defines a service as any feature that may be usable by another (remote) BT device. An SDP client may communicate with an SDP server using a reserved channel on an L2CAP link to discover what services are available. When the SDP client finds the desired service, the SDP client may request a separate connection to use the service. The reserved channel may be dedicated to SDP communication so that a device knows how to connect to the SDP service available on any other device. An SDP server may maintain an SDP database, which may include a set of service records that describe the services the SDP server offers. Along with information describing how an SDP client can connect to the service, the service records may contain a universally unique identifier (UUID) of the service.

The RFCOMM layer 310 may emulate the serial cable line settings and status of an RS-232 serial port. The RFCOMM layer 310 may connect to the lower layers of the BT protocol stack 300 through the L2CAP layer 314. By providing serial-port emulation, the RFCOMM layer 310 may support legacy serial-port applications. The RFCOMM layer 310 may also support the Object Exchange (OBEX) layer 308.

The OBEX layer 308 may define a communication protocol that may be used by devices to exchange data objects. The data objects may also be defined by the OBEX layer 308. A BT device that wants to set up an OBEX communication session with another device may be considered the client device. The client device initially may send one or more SDP requests to ensure that the other device can act as a server of OBEX services. If the server device can provide OBEX services, the server device may respond with the OBEX service record of the server device. The OBEX service record may contain an RFCOMM channel number that the client device may use to establish an RFCOMM channel. Further communication between the two devices may be conveyed in packets, which may contain requests, responses, and/or data. The format of the packet may be defined by the OBEX session protocol.

The application layer 302 may include at least one application 326, with which a user may interact and which may access BT communications for various functionality. The application 326 may access BT communications through one or more profiles 328, which may describe a variety of different types of tasks. By following procedures of one or more profiles 328, the application 326 may use BT communications according to a BT specification.

Figure 4:
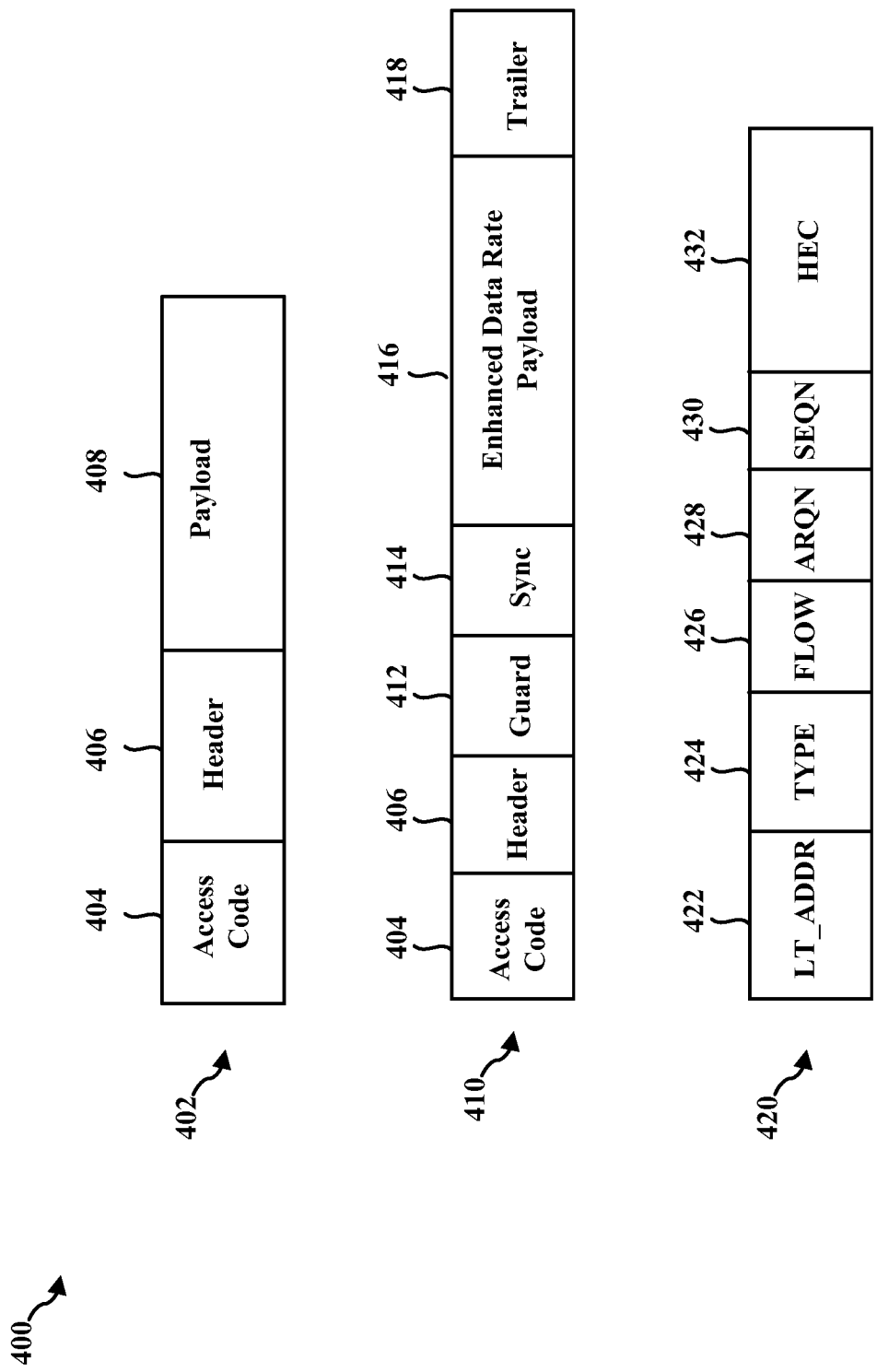
FIG. 4 is a diagram illustrating packet structures, in accordance with certain aspects of the disclosure.

FIG. 4 is an example diagram 400 illustrating a packet structures in accordance with certain aspects of the present disclosure. Data packets may be used with various short range wireless communications technologies, such as BT. The data packet 402 may be a general basic rate packet format. The data packet 402 may include an access code 402, a header 404, and a payload 406. The data packet 410 may be a general enhanced data rate packet format. The data packet 410 may include the access code 404, the header 406, a guard 412, a sync 414, an enhanced data rate payload 416, and a trailer 418. The access code 404 and header 406 of the of the data packet 410 may be identical in format and modulation to the data packet 402. The data packet 410 include a guard time and a synchronization sequence that follow the header. The data packet 410 also includes trailer symbols that follow the payload.

In some aspects, the access code 404 of packet 402 may comprise 72 or 68 bits, while the header 406 may comprise 54 bits. The payload 406 may have bits within the range of 0 bits to a maximum of 2790 bits. In some aspects, the packet 402 may comprise a shortened access code 404 only. In some aspects, the packet 402 may comprise the access code 404 and the header 406. In yet some aspects, the packet 402 may comprise the access code 404, the header 406, and the payload 408. The access code may identify the packets exchanged on a physical channel.

In some aspects, the header 420 may include a plurality of fields, including at least an LT_ADDR field 422, a TYPE field 424, a FLOW field 426, an ARQN field 428, a SEQN field 430, and a header-error-check (HEC) field 432. The header 420 may correspond to header 406 of data packets 402 and/or 410. The LT_ADDR field 422 may indicate a logical transport address. The LT_ADDR field 422 may be associated with a logical link. For example, a logical transport address included in the LT_ADDR field 422 may indicate a type of logical link (e.g., ACL, A2DP, eSCO, ISO, etc.). The TYPE field 424 may indicate which packet type is used. The type of packet used may depend on the logical transport address in the packet. The FLOW field 426 may be used for flow control of packets over an ACL logical transport. The ARQN 428 may be a 1-bit acknowledgement indication used to inform the source device of a successful transfer of payload data. The SEQN bit 430 provides a sequential numbering scheme to order the data packet stream. The SEQN bit may be alternated for every new data payload transmission. In instances where a PDU is retransmitted, the SEQN bit is not changed so the destination can compare the current SEQN bit value with the previous SEQN bit value. If the two values are different, then a new payload has been received, otherwise the payload is the same data payload or a repetition of the prior payload.

In the BR/EDR protocol, the packet may use an automatic repeat request (ARQ) protocol to inform the source device of the status of a received packet. Every time a receiving device (e.g., slave device) receives a data packet, the receiving device responds to the source device (e.g., master device) with an ACK or a NACK of the received packet. The ARQ may have a value of "1" or "0", where the value of "1" indicates an ACK, while the value of "0" indicates a NACK of the received data packet. An ACK indicates that the received data packet was received without errors, while a NACK indicates that the received data packet was received with errors. For example, the data packet may have some errors within the data packet, such as but not limited to, cyclic redundancy check (CRC) errors due to some of the packet bits being corrupted. Packet bits may become corrupted during transmission over the air. In another example, the received data packet may be received without any bit errors, but the packet may have data integrity errors, such as message integrity check (MIC) errors. MIC errors may occur when the receiver does not recognize the sender or source device of the received data packet. In such instance, the receiving device may respond with a NACK and discard the received data packet.

Each packet may have a sequence field, which may be a reflection of what is being sent. The sequence field may be is a 1-bit field used for a sequential numbering scheme. The sequence bit or SEQN bit may be used to distinguish new packets from retransmitted packets. Normally, the sequence bit will be inverted every time a new packet is sent. For example, the SEQN bit may have a value of "0" or "1", and a first packet may be sent with a SEQN bit value of 0. If the first packet is acknowledged, then the next packet will be sent with a SEQN bit value of 1. The SEQN bit will alternate between "0" and "1" for every new transmission. However, in instances of retransmitted packets, the SEQN bit will not be changed to enable the receiving device to determine that the packet is a retransmission. For example, if the first packet is sent with the SEQN bit value of "0", but the first packet is not acknowledged (e.g., NACK), then the next packet will be a retransmission of the first packet with the SEQN bit value of "0" again. Thus, the receiving device can determine that the current packet is a retransmission of the previous packet.

In some aspects, one or both of the ARQN bit and the SEQN bit may be corrupted during transmission, such that the value of the ARQN bit and/or the SEQN bit is flipped during transmission. As such, the received value of the ARQN bit and/or the SEQN bit is not what was originally transmitted. A flipped SEQN bit and/or a flipped ARQN bit may lead to packet losses and/or link failure. In addition, under some encryption schemes, data packets that experience a flipped SEQN bit and/or a flipped ARQN bit may lead to repeated MIC errors. Repeated MIC errors may be considered by a receiving device as receiving data packets from an attacking device (e.g., an unauthorized device attempting to gain unauthorized access to the receiving device), instead of receiving data packets from an authenticated device. In such instances, the receiving device may terminate the link in order to prevent reception of unauthorized data packets. In addition, a flipped SEQN bit and/or a flipped ARQN bit may lead the receiving device to interpret the received data as having repeated MIC errors sent from an unrecognized device, and ultimately causing the receiving device to terminate the link.

Link loss may be a consequence of receiving a PDU packet with a flipped SEQN bit and/or a flipped ARQN bit. The consequences for receiving bit errors in some other encryption schemes may not result in link loss. For example, there may be some packet losses, but the link may remain intact. In certain audio applications using certain encryption schemes, errors in the data packet may lead to packet loss which may lead to an audible glitch, rather than link loss. However, in other encryption schemes, such as but not limited to Advanced Encryption Standard-Counter with Cipher Block Chaining Message Authentication Code (AES-CCM), the result of receiving a flipped SEQN bit and/or a flipped ARQN bit is link loss. That is, the link will be terminated due to repeated MIC errors. AES-CCM encryption may depend on the packet counter of the data packet. Each packet transmitted will have a particular counter, which may be an incrementing counter. For example, the first packet or PDU transmitted may have a packet counter value of "1", the second new packet or PDU transmitted may have a packet counter value of "2", and the third new packet or PDU transmitted may have a packet counter value of "3", etc. However, retransmitted packets or PDUs may not have a new packet counter value. Retransmitted packets may have the same packet counter value of the previously transmitted packet, and the packet counter value will only increment on the transmission of new packets or PDUs. The packet counter value may not be sent over the air, but may instead be used as a key parameter for encrypting the data packet. Each packet may have a different input packet counter value for encryption. The receiving device employs the same encryption key (e.g., packet counter value) to decrypt the data packet. Thus, for AES-CCM encryption, the packet counters values should remain synchronized both on the transmit side and the receive side for reliable communication.

The packet counters may lose synchronization if one or more data packets are lost during transmission. If the packet counters lose synchronization, the receiving device may not be able to properly decrypt the data packets because the receiving device may not be using the proper encryption key to decrypt the data, which may result in an incorrect cipher key and repeated MIC errors. The receiving device may interpret the repeated MIC errors as an attack on the receiving device and may terminate the link. The packet counters losing synchronization may have a domino effect on the decryption of subsequent data packets, such that the decryption of subsequent data packets fail, which in turn may be interpreted as an attack by the receiving device, and result in a link loss between the transmitting device and receiving device.

Thus, for the above types of encryption, where receiving the flipped SEQN bit and/or the flipped ARQN bit results in a link loss, there exists a need for an error correction technique that may identify bit errors and take corrective actions to maintain the link.

The present disclosure provides an error correction technique that allows a receiving device to identify data packet errors, such as a flipped SEQN bit and/or a flipped ARQN bit, that may occur during transmission of the data packet, and to perform corrective actions to maintain the link with the source device. The receiving device may be configured to examine one or more portions of a data packet to identify errors in the data packet that occur during transmission. The techniques therefore provide error correction for the packet, including packet portions not protected by an imbedded error correction mechanism. As a result, the receiving device may not interpret a MIC error as an attack by an unauthorized device, but instead may be able to take corrective actions under certain conditions. In addition, data communications over noisy communication mediums may be more reliable as the techniques may reduce error rates and increase link stability between the receiving device and the source device.

Figure 5:
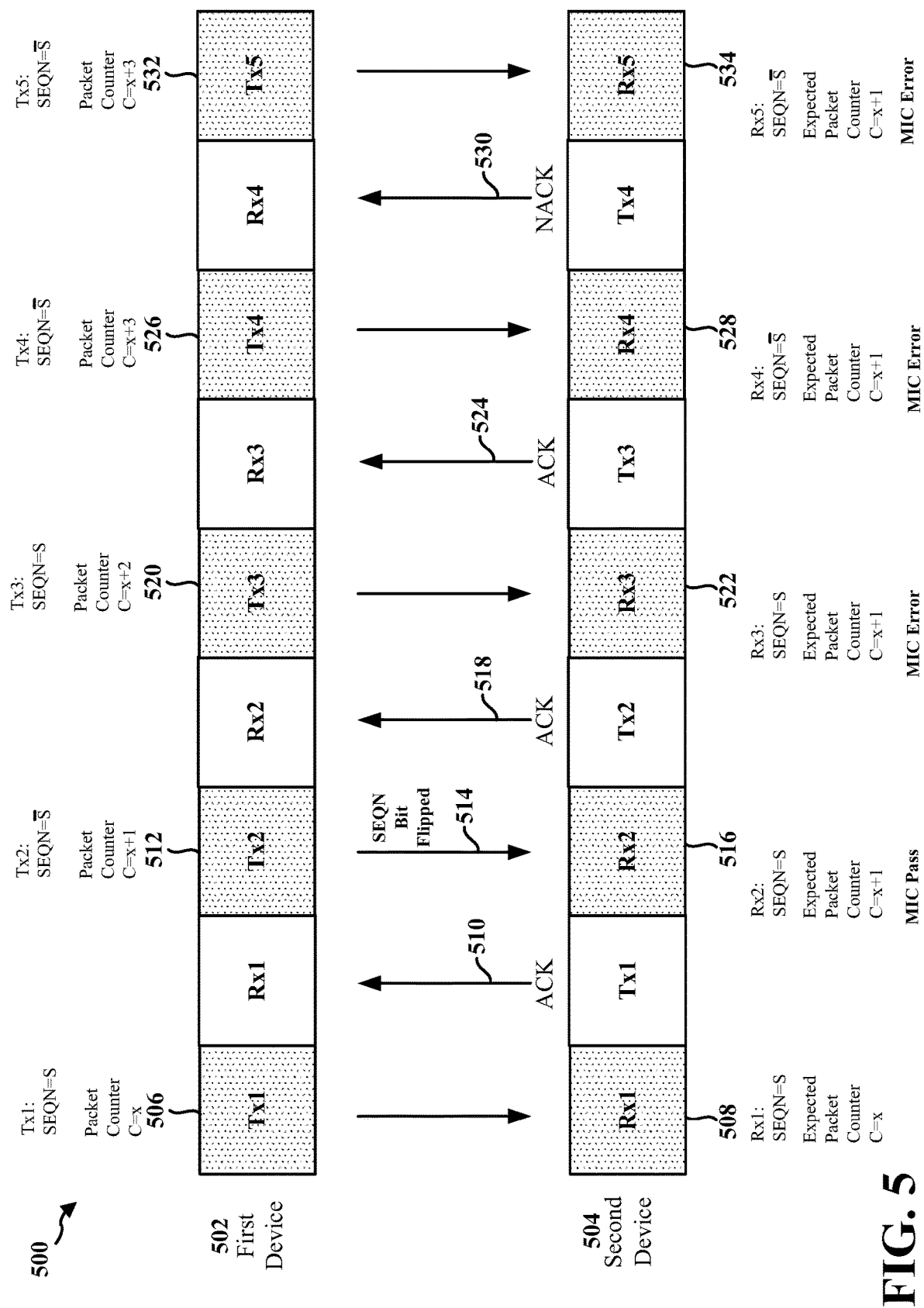
FIG. 5 is a diagram illustrating a wireless communication between a master device and a slave device.

FIG. 5 illustrates a data flow 500 for communications between a first device 502 and a second device 504 in a WPAN in the scenario where a SEQN bit of a packet is flipped during transmission of packets. First device 502 may correspond to a master device, and second device 504 may correspond to a slave device.

The first device 502 may transmit a first PDU 506. The first PDU 506 may have a SEQN bit value of S, and a packet counter value of "x". The second device 504 receives the first PDU from the first device 502 as the received first PDU 508. The received first PDU 508 has a SEQN bit value of S, and a packet counter value of "x". The SEQN bit and the packet counter value of the received first PDU 508 match the expected values for the SEQN bit and the packet counter value of the first PDU. In response the second device 504 may transmit an ACK 510 to the first device 502, indicating that the first PDU 506 was properly received.

The first device 502 may next transmit the second PDU 512. The second PDU 512 is a new packet and has a SEQN bit value of S-bar or $\overline{S}$, and a packet counter value of "x+1".

The second device 504 receives the second PDU transmitted from the first device 502 as the received second PDU 516. However, during transmission of the second PDU, the SEQN bit of the second PDU was flipped, such that the received second PDU 516 has a SEQN bit value of S, while the packet counter has a value of "x+1". In this instance, the received second PDU 516 may have a MIC pass due to the value of the received packet counter matching the expected packet counter value. However, since the received second PDU 516 had a SEQN bit value of S, the second PDU may be discarded as a duplicate because the value of the SEQN bit is the same as the last successfully received SEQN bit (e.g., SEQN bit of the received first PDU 508). As such, the second device 504 transmits an ACK 518.

The first device 502 may next transmit the third PDU 520. The first device 502 may configure the third PDU 520 to have a SEQN bit value of S, and a packet counter value of "x+2". The value of the packet counter is incrementing in the PDUs transmitted by the first device 502, because the previously transmitted PDUs have been ACK'd by the second device 504. As such, the first device 502 operates under the assumption that the PDUs are being properly received. The second device 504 receives the third PDU 520 transmitted from the first device 502 as the received third PDU 522. The second device 504 is expecting to receive the third PDU 522 having a SEQN bit value of $\overline{S}$, and expecting to receive a packet counter value of "x+1", due to the received second PDU 516 having a SEQN bit value the same as the SEQN bit of last successfully received PDU (e.g., SEQN bit of the received first PDU 508). Instead, the received third PDU 522 has a SEQN bit value of S and a packet counter value of "x+2". The received third PDU 522 may have a MIC fail because the packet counter value of "x+2" does not match the expected packet counter value of "x+1". In this instance, the MIC fail may be ignored, and the received third PDU 522 may be discarded as a duplicate because the SEQN bit of the received third PDU 522 is the same as the SEQN bit of the last successfully received PDU (e.g., SEQN bit of the received first PDU 508). The second device 504 may transmit an ACK 524 to the first device 502.

The first device 502 may next transmit the fourth PDU 526. The first device 502 may configure the fourth PDU 526 to have a SEQN bit value of $\overline{S}$ and a packet counter value of "x+3". The value of the packet counter is again incremented due to the ACK 524 received from the second device 504. The value of the SEQN bit is also alternated in response to the ACK 524. The second device 504 receives the transmitted fourth PDU 526 as received fourth PDU 528. The second device 504 is expecting to receive the fourth PDU 528 having a SEQN bit value of $\overline{S}$ and a packet counter number of "x+1". However, the received fourth PDU 528 has a SEQN bit value of $\overline{S}$ and a packet counter number of "x+3". The packet counter number of "x+3" of the received PDU 528 does not match the expected packet counter number of "x+1". As such, the received fourth PDU 528 may have a MIC fail, due to the packet counter number of the received fourth PDU not matching the expected packet counter number. The second device 504 may transmit a NACK 530 to the first device 502 due to the MIC fail; the received fourth PDU 528 is also discarded.

The first device 502, in response to the NACK 530, may transmit the fifth PDU 532. The fifth PDU 532 may be a retransmission of the fourth PDU 526 in response to the NACK 530. The transmitted fifth PDU 532 may be configured to have a SEQN bit value of $\overline{S}$ and a packet counter value of "x+3", which match the SEQN bit value and packet counter value of the transmitted fourth PDU 526. The second device 504 receives the transmitted fifth PDU 532 as received fifth PDU 534. The second device 504 is expecting the received fifth PDU 534 to have a SEQN bit value of $\overline{S}$ and a packet counter value of "x+1" (assuming no bit errors during transmission of the fifth packet). The received fifth PDU 534 may have a SEQN bit value of $\overline{S}$ which matches the expected value. However, the received fifth PDU 534 may have a packet counter value of "x+3", which does not match the expected value of "x+1". As such, the received fifth PDU 534 may have a MIC fail. The packet counters between the first device and second device are no longer synchronized and may enter a continuous loop of MIC errors. In such an instance, the second device 504 may interpret the repeated MIC errors as an attack by the transmitting device and may terminate the link as a defensive measure. In the scenario of FIG. 5, there is no way to recover from the loop of MIC errors, other than terminating the link. Thus, the result of one SEQN bit flipped in a PDU during transmission may lead to a loss of the link with the first device 502.

Figure 6:
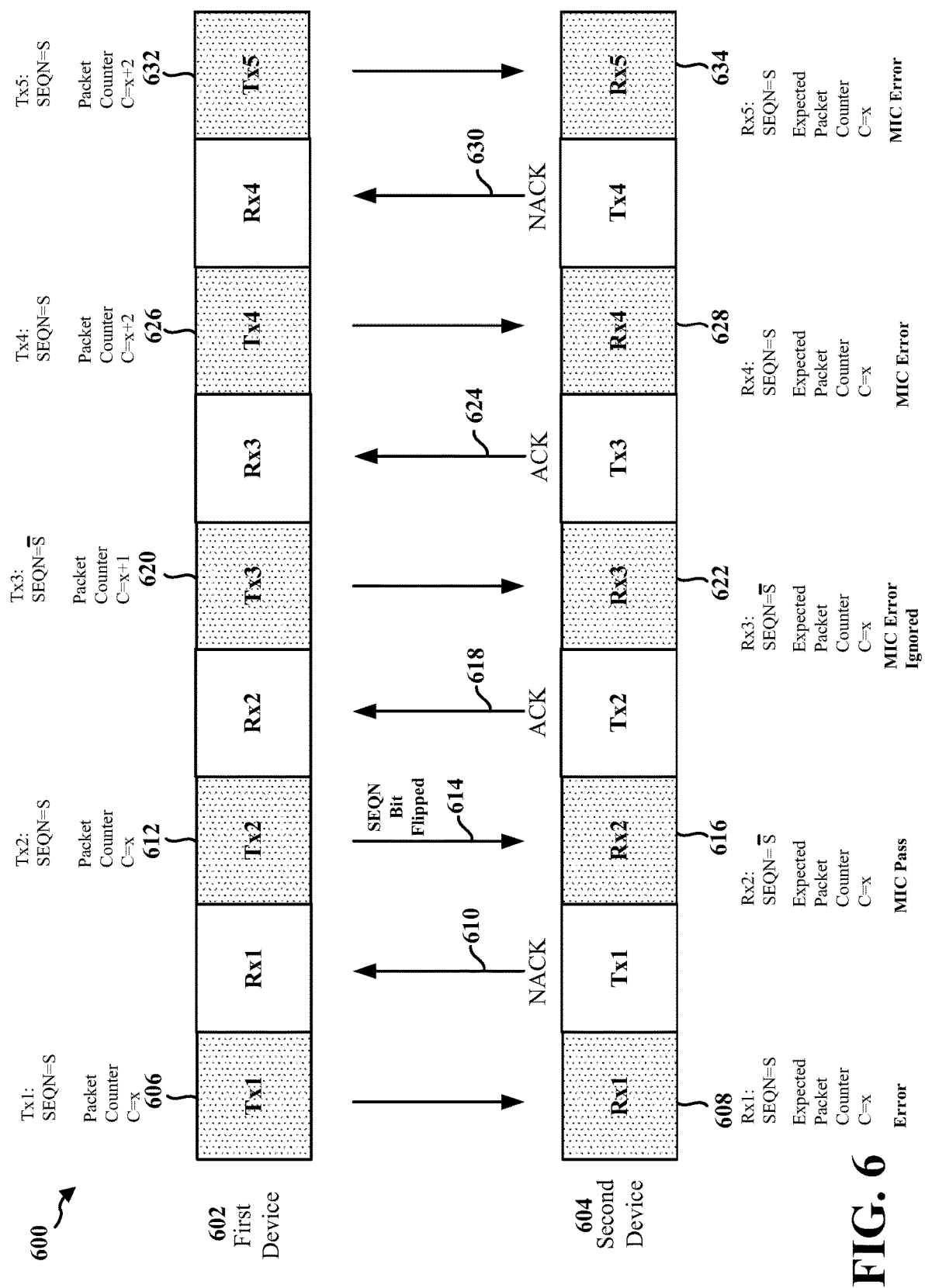
FIG. 6 is a diagram illustrating a wireless communication between a master device and a slave device.

FIG. 6 illustrates a data flow 600 for communications between a first device 602 and a second device 604 in a WPAN in another scenario where a SEQN bit of a PDU is flipped during transmission. First device 602 may correspond to a master device, and second device 604 may correspond to a slave device.

The first device 602 may transmit a first PDU 606. The first PDU 606 to be transmitted may have a SEQN bit value of S, and a packet counter value of "x". The second device 604 receives the transmitted first PDU from the first device 602 as the received first PDU 608. The received first PDU 608 has a SEQN bit value of S, and a packet counter value of "x". However, the received first PDU 608 may experience a CRC or MIC error despite the SEQN bit and the packet counter value of the received first PDU 508 matching the expected values for the SEQN bit and the packet counter value for the received PDU. In response the second device 504 may transmit a NACK 610 to the first device 602, indicating that the first PDU 606 was not properly received.

The first device 602 may next transmit the second PDU 612. The second PDU 612 is a retransmission of the first PDU 606 and has a SEQN bit value of S, and a packet counter value of "x", the same values as in the first PDU 606. The second device 604 receives the transmitted second PDU from the first device 602 as the received second PDU 616. However, during transmission 614 of the second PDU, the SEQN bit of the second PDU was flipped, such that the received second PDU 616 has a SEQN bit value of $\overline{S}$, while the packet counter having a value of "x". In this instance, the MIC of the received second PDU 616 may pass due to the value of the received packet counter matching the expected packet counter value. However, since the received second PDU 616 has a SEQN bit value of $\overline{S}$, due to the flipped SEQN bit, the second PDU may be discarded as a duplicate because the value of the SEQN bit is the same as the SEQN bit of the last successfully received PDU (e.g., SEQN bit of the received first PDU 608). As such, the second device 604 transmits an ACK 618.

The first device 602 may next transmit the third PDU 620. The first device 602 may configure the third PDU 620 to be transmitted to have a SEQN bit value of $\overline{S}$, and a packet counter value of "x+1". The value of the packet counter is incrementing in the PDUs transmitted by the first device 602, because the previously transmitted PDUs have been ACK'd by the second device 604. As such, the first device 602 operates under the assumption that the PDUs are being properly received. The second device 604 receives the transmitted third PDU 620 from the first device 602 as the received third PDU 622. The second device 604 is expecting to receive the third PDU 622 with a SEQN bit value of $\overline{S}$, and expecting to receive a packet counter value of "x", due to the received second PDU 616 having a SEQN bit value the same as the SEQN bit value of the last successfully received PDU (e.g., SEQN bit of the received first PDU 608). Instead, the received third PDU 622 has a SEQN bit value of $\overline{S}$ and a packet counter value of "x+1". The received third PDU 622 may result in a MIC fail because the packet counter value of "x+1" does not match the expected packet counter value of "x". In such an instance, the MIC failure may be ignored, and the received third PDU 622 may be discarded as a duplicate because the SEQN bit of the received third PDU 622 is the same as the SEQN bit of the last successfully received PDU (e.g., SEQN bit of the received second PDU 616). The second device 604 may transmit an ACK 624 to the first device 602 due to the second device 604 determining that the received third PDU 622 is a duplicate or retransmission.

The first device 602 may next transmit the fourth PDU 626. The first device 602 may configure the fourth PDU 626 to be transmitted to have a SEQN bit value of S and a packet counter value of "x+2". The value of the packet counter is again incremented due to the ACK 624 received from the second device 604. The value of the SEQN bit is also alternated in response to the ACK 624. The second device 604 receives the transmitted fourth PDU 626 as received fourth PDU 628. The second device 604 is expecting the received fourth PDU 628 to have a SEQN bit value of S and a packet counter number of "x" (for no errors in the values during transmission). The received fourth PDU 628 has a SEQN bit value of S and a packet counter number of "x+2". The packet counter number of "x+2" of the received fourth PDU 628 does not match the expected packet counter number of "x". As such, the received fourth PDU 628 may result in a MIC failure, due to the packet counter number of the received fourth PDU not matching the expected packet counter number. The second device 604 may transmit a NACK 630 to the first device 602 due to the MIC failure. The received fourth PDU 628 is also discarded.

The first device 602, in response to the NACK 630, may transmit the fifth PDU 632. The fifth PDU 632 may be a retransmission of the fourth PDU 626 in response to the NACK 630. The fifth PDU 632 to be transmitted may be configured to have a SEQN bit value of S and a packet counter value of "x+2", which match the SEQN bit value and packet counter value of the fourth PDU 626 which was transmitted. The second device 604 receives the transmitted fifth PDU 632 as received fifth PDU 634. The second device 604 is expecting the received fifth PDU 634 to have a SEQN bit value of S and a packet counter value of "x". The received fifth PDU 634 may have a SEQN bit value of S which matches the expected value. However, the received fifth PDU 634 may have a packet counter value of "x+2", which does not match the expected value of "x". As such, the received fifth PDU 634 may result in a MIC failure. In this scenario, as in the scenario of FIG. 5, the packet counters between the first device and second device lose synchronization and may enter a continuous loop of MIC errors. In such an instance, the second device 604 may interpret the repeated MIC errors as an attack and may terminate the link as a defensive measure. In the scenario of FIG. 6, there is no way to recover from the loop of MIC errors, other than by terminating the link. Thus, the result of one SEQN bit flipped during transmission of a PDU may lead to a loss of the link with the first device 602.

Figure 7:
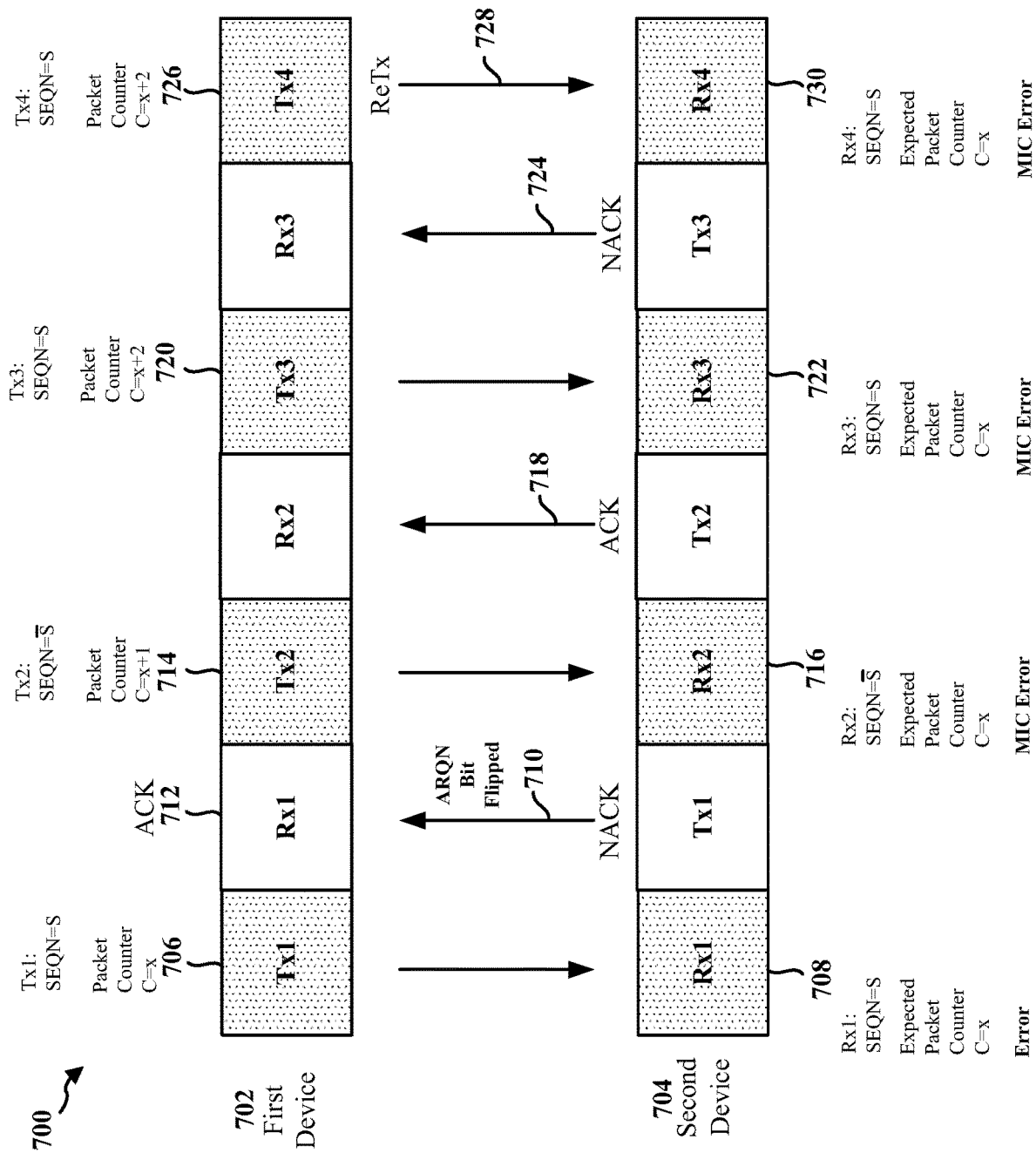
FIG. 7 is a diagram illustrating a wireless communication between a master device and a slave device.

FIG. 7 illustrates a data flow 700 for communications between a first device 702 and a second device 704 in a WPAN in a scenario where an ARQN bit of a PDU is flipped during transmission of the PDU. First device 702 may correspond to a master device, and second device 704 may correspond to a slave device The first device 702 may transmit a first PDU 706. The first PDU 706 may have a SEQN bit value of S, and a packet counter value of "x". The second device 704 receives the first PDU transmitted from the first device 702 as the received first PDU 708. The received first PDU 708 has a SEQN bit value of S, and a packet counter value of "x". However, the received first PDU 708 may experience a CRC error or a MIC error despite the SEQN bit and the packet counter value of the received first PDU 708 matching the expected values for the SEQN bit and packet counter value. In response the second device 704 may transmit a NACK 710 to the first device 702, indicating that the first PDU 706 was not properly received. However, during transmission, the value of the ARQN bit of the NACK 710 became corrupted and flipped value, such that the first device 702 received the NACK 710 as an ACK 712. As such, the first device 702 processes the ACK 712 and operates under the assumption that the first PDU 706 was properly received.

The first device 702 may then next transmit the second PDU 714, which is a new data packet and not a retransmission of the first PDU 706. Because the second PDU 714 is a new packet, the SEQN bit value is S̄, and the packet counter value is "x+1". That is, the result of the flipped ARQN bit causes the NACK to be received as an ACK, which in turn causes the first device 702 to not retransmit the first PDU 706 and instead move on to the next PDU or second PDU 714. The second device 704 receives the transmitted second PDU from the first device 702 as the received second PDU 716. The second device 704 is expecting the received second PDU 716 to be a retransmission of the first PDU 706. Thus the second device is expecting the received second PDU 716 to have a SEQN bit value of S and the packet counter value having a value of "x". However, the received second PDU 716 has a new SEQN bit value and new packet counter value indicating a new data packet. As a result, the received second PDU 716 results in a MIC failure at the second device due to the value of the received packet counter value of "x+1" not matching the expected packet counter value of "x". However, in this instance, the MIC error may be ignored, since the received second PDU 716 has a SEQN bit value of S̄, and the second PDU may be discarded because the value of the SEQN bit is the same as the SEQN bit of the last successfully received PDU. As such, the second device 704 transmits an ACK 718.

The first device 702 may next transmit the third PDU 720. The first device 702 may configure the third PDU 720 to be transmitted with a SEQN bit value of S, and a packet counter value of "x+2". The value of the packet counter is incrementing in the PDUs transmitted by the first device 702, because the previously transmitted PDUs have been ACK'd by the second device 704. As such, the first device 702 operates under the assumption that the transmitted PDUs are being properly received. The second device 704 receives the third PDU 720 transmitted from the first device 702 as the received third PDU 722. The second device 704 is expecting to receive the third PDU 722 with a SEQN bit value of S, and expecting to receive a packet counter value of "x". However, the received third PDU 722 has a SEQN bit value of S, but has a packet counter value of "x+2". The received third PDU 722 results in a MIC failure at the second device because the packet counter value of "x+2" does not match the expected packet counter value of "x". As a result of the MIC failure, the received third PDU 722 is considered not received properly. The second device 704 discards the received third PDU 722 and transmits a NACK 724.

The first device 702 may next transmit the fourth PDU 726. The first device 702 may configure the fourth PDU 726 to be transmitted with a SEQN bit value of S and a packet counter value of "x+2". The value of the SEQN bit and packet counter is the same as the third PDU 720 transmitted because the third PDU 720 was not received properly by the second device, thus the fourth PDU 726 is a retransmission of the third PDU 720. The second device 704 receives the fourth PDU 726 transmitted by the first device as the received fourth PDU 730. The second device 704 is expecting the received fourth PDU 730 with a SEQN bit value of S and a packet counter number of "x". However, the received PDU 730 has a SEQN bit value of S and a packet counter number of "x+2". The packet counter number of "x+2" of the received PDU 730, again, does not match the expected packet counter number of "x". As such, the received fourth PDU 730 results in a MIC failure, similar to the received third PDU 722, due to the packet counter number of the received fourth PDU 730 not matching the expected packet counter number. The second device 704 may transmit a NACK to the first device 702 due to the MIC failure and the received fourth PDU 730 is also discarded.

The packet counters between the first device and second device again lose synchronization and may enter a continuous loop of MIC errors. In such an instance, the second device 704 may interpret the repeated MIC errors as an attack and may terminate the link as a defensive measure. In the scenario of FIG. 7, there is no way to recover from the loop of MIC errors, other than terminating the link. Thus, the result of one ARQN bit flipped during transmission may lead to a loss of the link with the first device 702.

FIGS. 5-7 illustrate scenarios where a SEQN bit flip or a ARQN bit flip may occur. However, there may be other scenarios where the SEQN bit flip or the ARQN bit flip may occur. Table 1, below, provides a summary of possible scenarios and possible solutions for recovering from certain bit flips during packet transmission.

TABLE 1

| Case | Reception State (Last ESN was = S) | Received SEQN (Same or opposite of ESN) | MIC Result | CRC Result | Scenario | Current Action | Proposed New Action |
|---|---|---|---|---|---|---|---|
| 1-i | NACK, ESN = S | S | Pass | Pass | In current reception, current packet is received correctly without any errors. | ACK | No change |
| 1-ii | NACK, ESN = S | S | Pass | Fail | In current reception, received the expected SEQN, but with the packet having CRC errors. | NACK | No change |

TABLE 1-continued

| Case | Reception State (Last ESN was = S) | Received SEQN (Same or opposite of ESN) | MIC Result | CRC Result | Scenario | Current Action | Proposed New Action |
|---|---|---|---|---|---|---|---|
| 2-i | ACK, ESN = $\overline{S}$ | $\overline{S}$ | Pass | Pass | Current packet is received correctly without any errors. | ACK | No change |
| 2-ii | ACK, ESN = $\overline{S}$ | $\overline{S}$ | Pass | Fail | In current reception, received the expected SEQN, but with the packet having CRC errors. | NACK | No change |
| 3 | ACK, ESN = $\overline{S}$ | S | Fail | Pass/Fail | In current reception, received retransmission of SEQN, but with MIC failure. Compare MIC octets from previous packet and current packet without decryption of the packet, or compare CRC octets of previous packet with current packet, or both. If the MIC octets from previous packet and current packet without decryption of the packet, or the CRC octets of previous packet with current packet, or both match, respectively, then current reception is reTX, otherwise current reception is likely to be ESN with SEQN bit flip. | Discard packet and ACK the packet, because it is treated as retransmission | If current reception is determined as a reTX, ACK the packet. Else it is a packet received with a SEQN bit flip, and NACK the packet. |
| 4 | NACK, ESN = S | $\overline{S}$ | Fail | Pass/Fail | In current reception, there is a MIC failure, and received an unexpected SEQN. This is likely to be either a SEQN flip or a ARQN flip. | Discard packet and ACK the packet, because treated as retransmission | Initially, treat the current packet as received with a SEQN flip. NACK the packet and keep ESN = S (Note - reception state is unchanged). NACK the packet N times (N ≥ 1) or until we come out of this state (e.g., receive SEQN = S.) Note - An implementation may make N = 0, such that the error is treated directly as an ARQN error. If the state does not change after N NACKs, it is likely to be an ARQN flip where one of the NACKs for the packet is received as an ACK by the remote side, and hence it has transmitted the next packet. NACK the packet once more, change ESN = $\overline{S}$, and increment the packet counter. |
| 5 | ACK, ESN = $\overline{S}$ | S | Pass | Pass/Fail | In current packet, received an unexpected SEQN with MIC Pass. It is likely to be a SEQN flip. | Discard packet and ACK the packet, because treated as retransmission | 1. ACK the packet, e.g., accept the packet by accepting the SEQN as $\overline{S}$; or 2. NACK the packet. ESN remains the same as $\overline{S}$, (Note - the reception state moves to the new state which is: NACK, ESN = S) |
| 6 | NACK, ESN = S | $\overline{S}$ | Pass | Pass/Fail | The current packet is received with an unexpected SEQN, but with MIC Pass. | Discard packet and ACK the packet, because treated as retransmission | 1. ACK the packet (e.g., accept the packet by accepting the SEQN as $\overline{S}$; or 2. NACK the packet; or 3. NACK the packet for a configurable number of times, or until the reception state changes. If the reception state does not change after N NACKs, ACK the packet by accepting the packet |

TABLE 1-continued

| Case | Reception State (Last ESN was = S) | Received SEQN (Same or opposite of ESN) | MIC Result | CRC Result | Scenario | Current Action | Proposed New Action |
| --- | --- | --- | --- | --- | --- | --- | --- |
| 7 | NACK, ESN = S | S | Fail | Pass/Fail | In current reception, received the expected SEQN, but with the packet having CRC and MIC errors or only MIC errors. | NACK | as a packet with SEQN = $\overline{S}$ No Change |
| 8 | ACK, ESN = $\overline{S}$ | $\overline{S}$ | Fail | Pass/Fail | In current reception, received the expected SEQN, but with the packet having CRC and MIC errors or only MIC errors. | NACK | No Change |

Table 1 above provides 8 possible scenarios that may occur when receiving a packet. The column labeled Reception State (Last ESN was =S) is the action the receiving device may take in response to receiving a packet having a SEQN bit value of S. For example, the first packet reception after encryption, the initial Reception State may be ACK, ESN=S. The column labeled Received SEQN (Same or opposite of ESN) indicates the value of the SEQN bit for the next packet received by the receiving device. For example, a reception state may be defined by action taken on the last reception which is ACK or NACK and then setting up the ESN. The column MIC result is the result of a message integrity check done by the receiving device on the next packet received by the receiving device. The column CRC Result is the result of a cyclic redundancy check done by the receiving device on the next packet received by the receiving device. In some aspects, the BR/EDR protocol may have packets known as Poll/Null which are empty packets, such that the Poll/Null packets do not have a payload. As such MIC and CRC are not present, but in such Poll/Null packets the SEQN bit is not used. Thus, the determination of a SEQN flip is determined based on packets that carry a payload. With regards to the ARQN flip, empty packets may have a valid ARQN bit (e.g., they can be used to ACK or NACK), the determination of ARQN flip is for packets that were sent as a NACK and may be sent in empty packets or payload carrying packets. The determination of ARQN flip may be based on reception of a next packet with a SEQN (e.g., a payload carrying packet). As such, the Table 1 is used for payload carrying receptions, because it is clear from the reception state which is based on ESN, which in turn means payload carrying packets.

The Scenario column describes what may occur during the transmission of the packet from the transmitting device to the receiving device, and/or what the receiving device receives. The Current Action column describes conventional actions a receiving device may take in response to the occurrence described in the Scenario column. The Proposed New Action column describes corrective actions the receiving device may take in response to the occurrence described in the Scenario column. In some of the possible scenarios listed in Table 1 failing CRC would result in the receiving device sending a NACK and not being able to data mine the packet to determine the MIC pass/fail, as well as determining the SEQN bit value and/or the packet counter value.

In the first scenario (e.g., 1-i and 1-ii) of Table 1, the transmitting device transmits a packet having a SEQN bit value of S, but the receiving device did not properly receive the packet and transmits a NACK to the transmitting device. The NACK informs the transmitting device that the receiving device did not properly receive the packet. The transmitting device then sends the next packet, which is a retransmission of the previous packet, to the receiving device. The receiving device receives the next or current packet without any errors and determines that the next packet has a SEQN bit value of S and that the MIC passes because the packet counters between the transmitting and receiving devices are synchronized, such that the value of the packet counter of the next packet matches the expected value of the packet counter for the next packet. The receiving device determines that the next packet is a retransmission of the previous packet because the next packet has a SEQN bit value of S which matches that of the previous packet, and because the packet counters are synchronized. The receiving device acknowledges receipt of the next packet by transmitting an ACK to the transmitting device. In some aspects, such as in 1-ii, the receiving device may receive the next or current packet with the expected SEQN, but with the packet having CRC errors. In such aspects, the receiving device may NACK the next or current packet due to the packet having CRC errors.

In the second scenario (e.g., 2-i and 2-ii) of Table 1, the transmitting device transmits a packet having a SEQN bit value of $\overline{S}$, and the receiving device properly receives the packet without any errors and acknowledges the packet by transmitting an ACK to the transmitting device. The transmitting device then transmits the next packet having a SEQN bit value of $\overline{S}$, and the receiving device properly receives the next packet because the SEQN bit value of the second packet matches an expected SEQN bit value for the next packet, and the MIC passes at the receiving device because the packet counter value of the next packet matches the expected packet counter value. The receiving device determines that the next packet is the next packet of the sequence of packets intended to be received. The receiving device acknowledges the next packet by transmitting an ACK to the transmitting device. In some aspects, such as in 2-ii, the receiving device may receive the next or current packet with the expected SEQN, but with the packet having CRC errors. In such aspects, the receiving device may NACK the next or current packet due to the packet having CRC errors.

In the third scenario (e.g., 3) of Table 1, the transmitting device transmits a packet having a SEQN bit value of S, and the receiving device properly receives the packet and acknowledges the packet by transmitting an ACK to the transmitting device. The transmitting device transmits the next packet, but the next packet has a SEQN bit value of S. The transmitting device has retransmitted the previous packet. This may occur if the ACK from the receiving device was lost or not received by the transmitting device, or if an ARQN bit of the ACK was flipped during transmission such that the transmitting device received the ACK as a NACK. In such an instance, the SEQN of the next or retransmitted packet may not match the expected SEQN because the receiving device is expecting a new packet and not a retransmission of the previous packet. Also, the packet counter value of the next or retransmitted packet is the same as the previous packet, and may not match the expected packet counter value, such that the next or retransmitted packet may have a MIC failure. This third scenario is not problematic because if the ACK was lost or got corrupted and was received as a NACK, then the transmitting device may retransmit the previous packet. The receiving device may identify the next packet as a retransmitted packet because the SEQN and packet counter values may match the previously acknowledged packet. For example, the receiving device may compare the MIC octets from the previous packet (e.g., last successfully received packet) and the MIC octets from the current packet (e.g., information received in the current reception) without decrypting the packet. If the MIC octets match, then the current packet may be identified as a retransmission. In some aspects, the receiving device may compare the CRC octets of the previous packet and the CRC octets of the current packet. If the CRC octets match, then the current packet may be identified as a retransmission. In some aspects, the receiving device may compare the MIC octets and the CRC octets from the previous packet and the MIC octets and the CRC octets from the current packet. If both the MIC octets and CRC octets match, then the current packet may be identified as a retransmission. A corrective action that the receiving device may take is to discard the retransmitted packet, because it is treated as a retransmission, and transmit an ACK to the transmitting device so that the transmitting device may move on and transmit the next packet. However, in some aspects, the receiving device may determine that the packet is a new or the next packet, and may assume that the packet has a SEQN bit flip and may NACK the packet.

In the fourth scenario (e.g., 4) of Table 1, the transmitting device transmits a packet having a SEQN bit value of S, but the receiving device does not properly receive the packet and transmits a NACK to the transmitting device. The transmitting device transmits the next packet, but the next packet has a SEQN bit value of $\overline{S}$ which would appear to be a new packet instead of a retransmission of the previously improperly received packet. In addition, the next packet has a MIC failure at the receiving device, which means that the packet counter values of the transmitting and receiving devices are not synchronized. Thus, some sort of error has occurred to cause the transmitting device to transmit a packet having an unexpected SEQN and/or incremented packet counter value instead of retransmitting the originally improperly received packet. The receiving device, under conventional actions, may respond by ignoring the MIC failure, discarding the packet, and transmitting an ACK to the transmitting device. The ACK will be sent due to the SEQN bit value of the next packet being the same as the last successfully received SEQN bit. However, the subsequent packet transmitted by the transmitting device may start the repeated MIC errors, as discussed in FIG. 7, due to the packet counters becoming unsynchronized, and lead to link loss. A corrective action that the receiving device may take, in accordance to certain aspects of the disclosure, is to initially treat the current packet as received with an SEQN flip. As such, the receiving device may NACK the packet and keep ESN=S, with the reception state being unchanged. The receiving device may NACK the packet N times, where N≥0, or until an expected SEQN is received along with a MIC pass and a CRC pass, whichever is earlier. The counter for N is reset to zero (0) when the expected SEQN is received. In some aspects, N may equal 0, such that the error may be treated directly as an ARQN error. However, if the expected SEQN is not received after the N NACKs, it is likely to be an ARQN flip, where one of the NACKs for the packet is received as an ACK by the remote side, which caused the remote side to transmit the next packet. In such aspects, a further corrective action the receiving device may take is to treat the reception as having an ARQN bit flip, which may have occurred during the transmission of the NACK from the receiving device to the transmitting device, which caused the transmitting device to receive the NACK as an ACK. This in turn led to the transmitting device transmitting a new packet with an incremented SEQN bit value and incremented packet counter value, which resulted in the MIC failure. The receiving device may take corrective action, as discussed below, of transmitting a NACK, change the value of the expected SEQN, and increment the packet counter value. The corrective actions may overcome the ARQN bit flip and prevent the repeated MIC errors and maintain the communications link between the transmitting and receiving devices.

In the fifth scenario (e.g., 5) of Table 1, the transmitting device transmits a packet having a SEQN bit value of S, and the receiving device properly receives the packet and acknowledges the packet by transmitting an ACK to the transmitting device. The transmitting device transmits the next packet, but the next packet has a SEQN bit value of S which would appear to be a retransmission of the previously acknowledged packet. However, the next packet has a MIC pass at the receiving device, which means that the packet counter value of the next packet matches the expected packet counter value. The SEQN bit of the next packet does not match the expected SEQN bit, but the packet counters of the transmitting and receiving devices are synchronized because of the MIC pass. The receiving device, under conventional actions, may respond by discarding the packet and sending an ACK to the transmitting device because the SEQN of the next packet matches the SEQN of the prior acknowledged packet. However, the subsequent packet transmitted by the transmitting device may start the repeated MIC errors, as discussed in FIG. 5, due to the packet counters becoming unsynchronized, and lead to link loss. A corrective action that the receiving device may take, in accordance to certain aspects of the disclosure, is to identify that a SEQN bit flip has occurred during the transmission of the next packet, which led to the next packet having a SEQN bit value of S, while having a MIC pass. The receiving device may take corrective actions, as discussed below, that may overcome the SEQN bit flip and prevent the repeated MIC errors and maintain the communications link between the transmitting and receiving devices. In some aspects, the corrective actions may include ACKing the packet, such that the receiving device accepts the packet by accepting the SEQN as $\overline{s}$. In some aspects, the corrective actions may include NACKing the packet, and the ESN remains the same as $\overline{s}$, such that the reception state moves to the new state of NACK, ESN=S.

In the sixth scenario (e.g., 6) of Table 1, the transmitting device transmits a packet having a SEQN bit value of S, but the receiving device does not properly receive the packet and transmits a NACK to the transmitting device. The transmitting device transmits the next packet, but the next packet has an unexpected SEQN bit value of $\overline{S}$ which would appear to be a new packet instead of a retransmission of the previous packet. However, the next packet has a MIC pass at the receiving device, which means that the packet counter value of the next packet matches the expected packet counter value. The SEQN bit of the next packet does not match the expected SEQN bit, but the packet counters of the transmitting and receiving devices are synchronized because of the MIC pass. The receiving device, under conventional actions, may respond by discarding the packet and sending an ACK to the transmitting device because the SEQN of the next packet matches the SEQN of the prior acknowledged packet. However, the subsequent packet transmitted by the transmitting device may start the repeated MIC errors, as discussed in FIG. 6, due to the packet counters becoming unsynchronized, and lead to link loss. A corrective action that the receiving device may take, in accordance to certain aspects of the disclosure, is to identify that a SEQN bit flip has occurred during the transmission of the next packet, which led to the next packet having a SEQN bit value of $\overline{S}$, while having a MIC pass. The receiving device may take corrective measures, as discussed below, that may overcome the SEQN bit flip and prevent the repeated MIC errors and maintain the communications link between the transmitting and receiving devices. In some aspects, the corrective actions may include ACKing the packet, such that the receiving device accepts the SEQN as $\overline{s}$. In some aspects, the corrective actions may include NACKing the packet. In some aspects, the corrective actions may include NACKing the packet for a configurable number of time, or until the reception state changes. If the reception state does not change after N NACKs, then ACK the packet by accepting the packet as a packet with SEQN=$\overline{s}$.

In the seventh scenario of Table 1, the transmitting device transmits a first packet having a SEQN bit value of S, but the receiving device does not properly receive the first packet and transmits a NACK to the transmitting device. The transmitting device transmits the next or second packet, but the receiving device determines that the second packet has a SEQN bit value of S, which matches the expected SEQN bit value, but the second packet has CRC and MIC errors or only MIC errors at the receiving device. The second packet having a MIC failure at the receiving device would indicate that the packet counters are not synchronized. Thus, some sort of error may have occurred that has caused the next or second packet to have a SEQN bit value that matches the expected SEQN bit value, but not have a MIC pass.

In some instances, the NACK transmitted due to the first packet not being properly received may have become corrupted and experienced an ARQN bit flip such that the NACK is received as an ACK by the transmitting device. Thus, the transmitting device operates under the assumption that the first packet was properly received and prepares to transmit a second packet having incremented values for the SEQN bit and packet counters. However, the second packet may have experienced bit errors during transmission of the second packet to the receiving device, such that the second packet experiences a SEQN bit flip. As such, the receiving device receives the second packet as having a SEQN bit value of S (instead of $\overline{S}$) and having an incremented packet counter value. The SEQN bit value of the second packet matches the expected value (due to the SEQN bit flip), but the packet counter value of the second packet does not match the expected packet counter value, because the expected packet counter value is a non-incremented value (due to the NACK of the first packet) and the packet counter value of the second packet is an incremented value (due to the erroneous received ACK).

The receiving device, under conventional actions, may respond by transmitting a NACK to the transmitting device due to the MIC failure, to indicate that the second packet was not properly received. The transmitting device may properly receive the NACK and may transmit a third packet which is a retransmission of the second packet. The receiving device may receive the third packet and determine that it is a retransmission of the second packet, and may discard the third packet and transmit an ACK to the transmitting device. The transmitting device may transmit a fourth packet which has an incremented SEQN bit value and an incremented packet counter value. At this point, the receiving device may encounter repeated MIC errors, and lead to link loss.

A corrective action that the receiving device may take, in accordance to certain aspects of the disclosure, is to identify that an ARQN bit flip has occurred during the transmission of the NACK, in response to the first packet not being properly received, from the receiving device to the transmitting device, which caused the transmitting device to receive the NACK as an ACK. This in turn led to the transmitting device transmitting the second packet with an incremented SEQN bit value and incremented packet counter value. The receiving device may be further configured to determine that an SEQN bit flip has occurred during transmission of the second packet, such that the SEQN bit value of the second packet matches the expected SEQN bit value, but still has a MIC failure at the receiving device. In instances where the receiving device determines that an ARQN bit flip and SEQN bit flip has occurred, the receiving device may respond by transmitting a NACK to the transmitting device due to the second packet having MIC failure. The transmitting device may transmit the third packet which is a retransmission of the second packet. The receiving device may receive the third packet and determine that the SEQN bit value of the third packet being incremented with respect to the second packet, and in combination with the second packet having a MIC failure may be indicative of an ARQN bit flip. The receiving device may take corrective action that may overcome the ARQN bit flip. For example, the corrective actions taken by the receiving device may include discarding the third packet (after identifying that an ARQN bit flip has occurred) sending a NACK to the transmitting device, and incrementing the packet counter value by 1. The receiving device may take corrective action, as discussed below, that may overcome the ARQN bit flip and prevent the repeated MIC errors and maintain the communications link between the transmitting and receiving devices.

In the eighth scenario (e.g., 8) of Table 1, the transmitting device transmits a first packet having a SEQN bit value of S, and the receiving device properly receives the first packet and transmits an ACK to the transmitting device. The transmitting device transmits the next or second packet having a SEQN bit value of $\overline{S}$ which matches the expected SEQN bit value, however, the next or second packet has CRC and MIC errors or only MIC errors at the receiving device. The next or second packet having a MIC failure may indicate that the packet counter values are not synchronized. Thus, some sort of error may have occurred that has caused the next or second packet to have a SEQN bit value that matches the expected SEQN bit value, but not have a MIC pass.

As discussed in the seventh scenario of Table 1, an ARQN bit flip may have occurred in combination with a SEQN bit flip, such that the ACK sent by the receiving device to indicate that the first packet was properly received was instead received as a NACK by the transmitting device. The transmitting device then transmits the next or second packet to the receiving device, which would be a retransmission of the first packet, but a SEQN bit flip occurs such that the next or second packet has a SEQN bit value that is incremented due to the SEQN bit flip and matches the expected SEQN bit value. However, the packet counter value of the next or second packet matches that of the first packet because the next or second packet is a retransmission of the first packet. As such, the packet counter value of the next or second packet does not match the expected packet counter value, because the receiving device is expecting an incremented packet counter value while the transmitting device is transmitting a retransmission due to the erroneous NACK.

The receiving device, under conventional actions, may respond by transmitting a NACK to the transmitting device due to the MIC failure, to indicate that the next or second packet was not properly received. The transmitting device may properly receive the NACK and may transmit a subsequent or third packet which is a retransmission of the next or second packet. The receiving device may receive the subsequent or third packet and determine that it is a retransmission of the next or second packet which is a retransmission of the first packet, because the SEQN bit value of the third packet matches SEQN bit value of the first packet. The packet counter value of the third packet also matches the packet counter value of the first packet, which also matches the expected packet counter value at the receiving device. Thus, the receiving device would determine that the third packet is a retransmission of the first packet which has already been acknowledged. As such, the receiving device may discard the packet and transmit an ACK.

Figure 8:
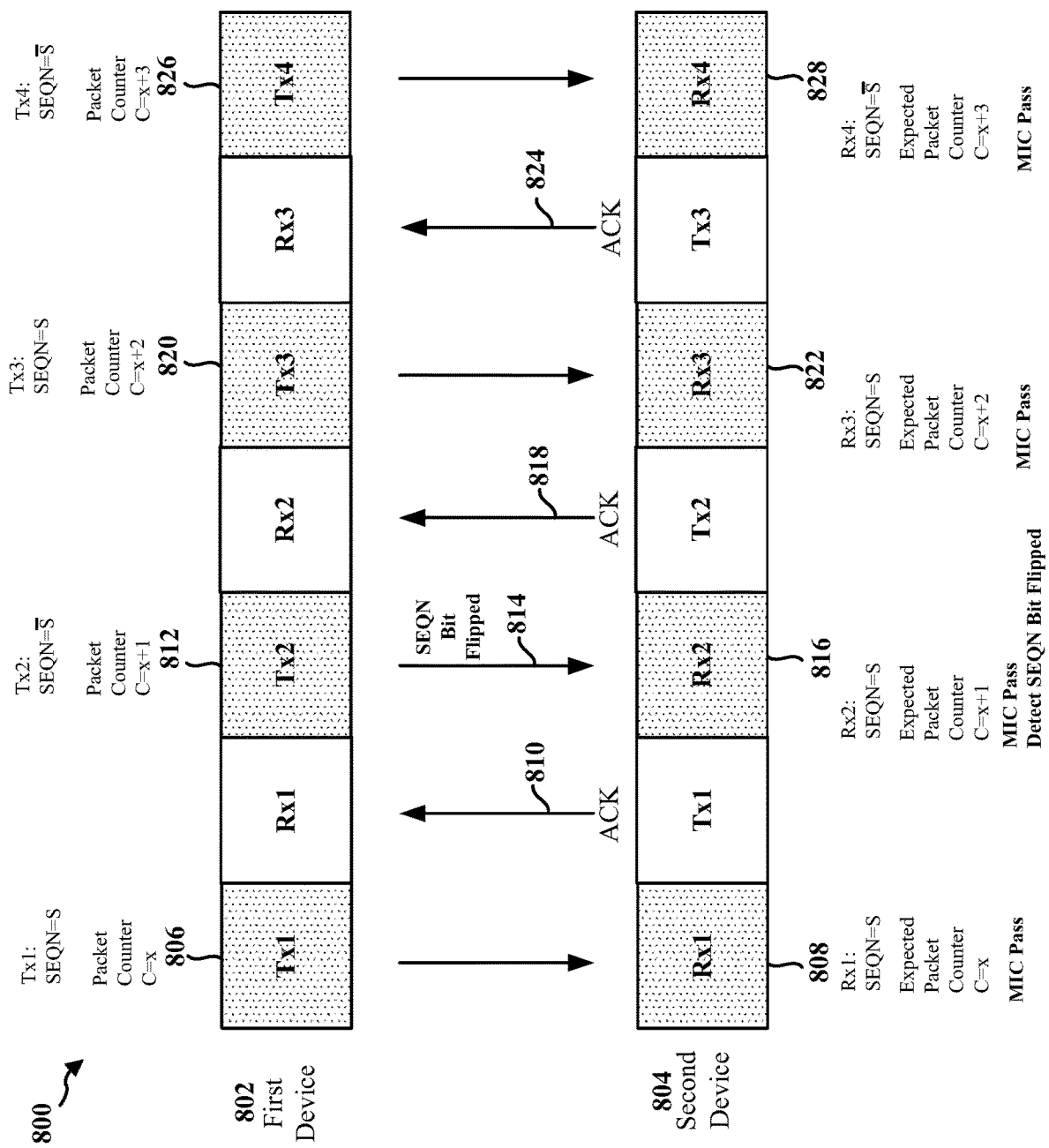
FIG. 8 is a diagram illustrating a wireless communication between a master device and a slave device, in accordance with certain aspects of the disclosure.

FIG. 8 illustrates a data flow 800 for communications between a first device 802 and a second device 804 in a WPAN in accordance with certain aspects of the disclosure. First device 802 may correspond to a master device, and second device 804 may correspond to a slave device. The first device or master device 802 may correspond to, e.g., the wireless device 102, peripheral device 104, 106, 110, 112, 114, wireless device 200, 802, 804, 902, 904, 1002, 1004, 1102, 1104, 1202, 1204, 1450, or the apparatus 1402/1402'. The second device or slave device 804 may correspond to, e.g., the wireless device 102, peripheral device 104, 106, 110, 112, 114, wireless device 200, 802, 804, 902, 904, 1002, 1004, 1102, 1104, 1202, 1204, 1450, or the apparatus 1402/1402'. FIG. 8 provides a scenario where a SEQN bit is flipped along with corrective actions that may be utilized to maintain the link.

The first device 802 may transmit a first PDU 806. The first PDU 806 may be configured to have a SEQN bit value of S, and a packet counter value of "x". The second device 804 receives the first PDU 806 transmitted from the first device 802 as the received first PDU 808. The received first PDU 808 has a SEQN bit value of S, and a packet counter value of "x". The SEQN bit and the packet counter value of the received first PDU 808 match the expected values for the SEQN bit value and packet counter value and results in a MIC pass as the second device. In response, the second device 804 may transmit an ACK 810 to the first device 802, indicating that the first PDU 806 was properly received.

The first device 802 may next transmit the second PDU 812. The second PDU 812 is a new packet and may be configured to have the value of the second PDU's SEQN bit and packet counter incremented. As such, the second PDU 812 may have a SEQN bit value of $\bar{S}$, and a packet counter value of "x+1". The second device 804 receives the second PDU 812 transmitted from the first device 802 as the received second PDU 816. However, during transmission 814 of the second PDU 812, the SEQN bit of the second PDU 812 became flipped, such that the received second PDU 816 has a SEQN bit value of S instead of the expected value of $\bar{S}$, while the packet counter has a value of "x+1". In such an instance, the received second PDU 816 may result in a MIC pass at the second device due to the value of the received packet counter matching the expected packet counter value. However, the SEQN bit value of the received second PDU 816 has a SEQN bit value of S and does not match the expected SEQN bit value. Typically, the received second PDU 816 would be discarded because of the mismatch of the SEQN bit and the expected SEQN bit. However, the second device 804 may be configured to identify whether the SEQN bit of the received second PDU 816 may have been flipped during transmission 814.

In the present aspect, the SEQN bit value of S of the received second PDU 816 is the same as the SEQN bit of the last successfully received PDU (e.g., SEQN bit of the received first PDU 808), while having a MIC pass. The received second PDU 816 results in a MIC pass at the second device because the value of the packet counter of the received second PDU 816 matches the value of the expected packet counter for the received second PDU 816. Thus, when a received PDU has a value of the SEQN bit that matches or repeats the SEQN bit of the last successfully received PDU, along with the received PDU having a MIC pass, then the second device 804 may identify the SEQN bit of the received second PDU 816 as a flipped bit. The second device 804 may determine that the actual value of the SEQN bit of the received second PDU 816 is $\bar{S}$. Thus, under certain conditions, the second device may identify the SEQN bit as a flipped bit and process the received second PDU 816 as if the SEQN bit was not flipped. After identifying the SEQN bit as a flipped SEQN bit, the second device 804 may process the received second PDU 816 with the SEQN bit inverted and then transmit the ACK 818. In some aspects, after identifying the SEQN bit as a flipped SEQN bit, the second device 804 may change the SEQN bit value to the correct or expected SEQN bit value, process the received second PDU 816 and transmit the ACK 818. In some aspects, the second device 804 may not change the SEQN bit value to the corrected or expected SEQN bit value, after identifying the SEQN bit as a flipped SEQN bit, but instead may process the received second PDU 816 with the understanding that the SEQN bit was flipped and the actual value of the SEQN bit matches the expected SEQN bit value.

The first device 802 may next transmit the third PDU 820. The first device 802 may configure the third PDU 820 to have a SEQN bit value of S, and a packet counter value of "x+2". The value of the packet counter and SEQN bit is incremented in the PDUs transmitted by the first device 802, because the previously transmitted PDUs have been ACK'd by the second device 804. The second device 804 receives the third PDU 820 transmitted from the first device 802 as the received third PDU 822. The second device 804 is expecting to receive the third PDU 822 having a SEQN bit value of S, and expecting to receive a packet counter value of "x+2", due to the received second PDU 816 being acknowledged by the second device 804 as being received properly. When the second device 804 transmits an ACK to the first device 802, the second device 804 increments the values of the expected SEQN bit and the packet counter, such that the second device 804 may prepare for the reception of a new data packet.

The received third PDU 822 has a SEQN bit value of S and a packet counter value of "x+2" which matches the expected values of the SEQN bit and the packet counter. The received third PDU 822 may result in a MIC pass as the second device due to the packet counter matching the expected packet counter. The second device 804 may process the received third PDU 822 and transmit an ACK 824 to the first device 802.

The first device 802 may next prepare the fourth PDU 826 for transmission. The first device 802 may increment the values of the SEQN bit and the packet counter in response of receiving the ACK 824. The first device 802 may configure the fourth PDU 826 to have a SEQN bit value of $\overline{S}$ and a packet counter value of "x+3". The second device 804 receives the PDU 826 transmitted by the first device as received fourth PDU 828. The second device 804 is expecting to receive the fourth PDU 828 having a SEQN bit value of $\overline{S}$ and a packet counter value of "x+3". The received fourth PDU 828 has a SEQN bit value of $\overline{S}$ and a packet counter value of "x+3" which match the expected values of the SEQN bit and the packet counter value of "x+1". As such, the received fourth PDU 828 results in a MIC pass at the second device, due to the packet counter of the received fourth PDU matching the expected packet counter. The second device 804 may then process the received fourth PDU 828 and transmit an ACK to the first device 502 to continue the process.

In the aspect of FIG. 8, the second device may take corrective action when identifying a SEQN bit as a flipped SEQN bit. During the corrective actions, the second device 804 may maintain the link with the first device 802 by ensuring that the packet counters between the first device 802 and second device 804 do not lose synchronization. The corrective actions may be able to correct the MIC errors due to the SEQN bit being flipped. The corrective actions may thereby prevent repeated MIC errors at the second device which would lead to link loss.

Figure 9:
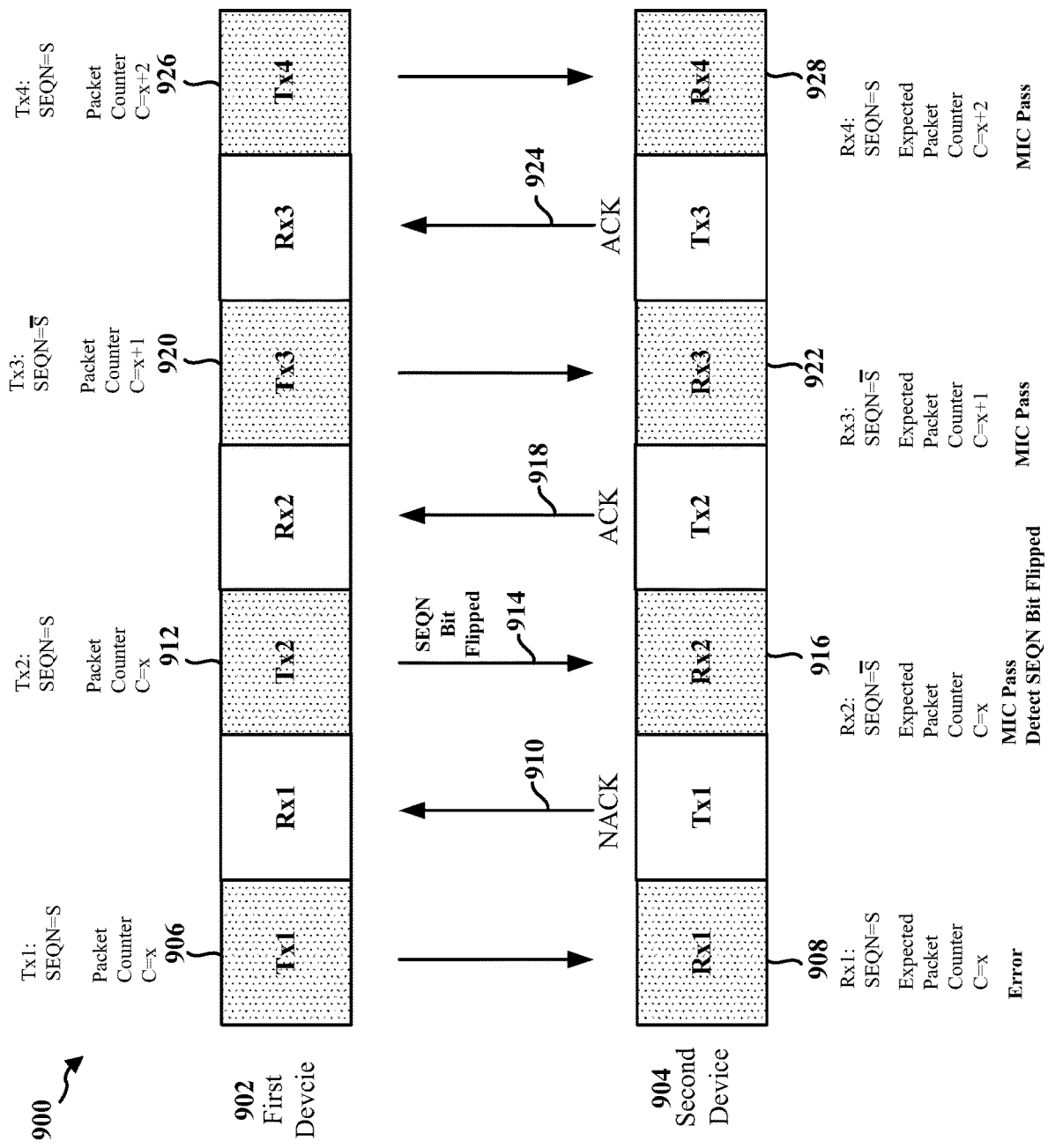
FIG. 9 is a diagram illustrating a wireless communication between a master device and a slave device, in accordance with certain aspects of the disclosure.

FIG. 9 illustrates a data flow 900 for communications between a first device 902 and a second device 904 in a WPAN in accordance with certain aspects of the disclosure. The first device 902 may correspond to a master device, and the second device 904 may correspond to a slave device. The first device or master device 902 may correspond to, e.g., the wireless device 102, peripheral device 104, 106, 110, 112, 114, wireless device 200, 802, 804, 902, 904, 1002, 1004, 1102, 1104, 1202, 1204, 1450, or the apparatus 1402/1402'. The second device or slave device 904 may correspond to, e.g., the wireless device 102, peripheral device 104, 106, 110, 112, 114, wireless device 200, 802, 804, 902, 904, 1002, 1004, 1102, 1104, 1202, 1204, 1450, or the apparatus 1402/1402'. FIG. 9 illustrates another scenario where a SEQN bit is flipped during transmission of a PDU along with corrective actions that may be utilized to maintain the link.

The first device 902 may transmit a first PDU 906. The first PDU 906 may be configured to have a SEQN bit value of S, and a packet counter value of "x". The second device 904 receives the first PDU 906 transmitted from the first device 902 as the received first PDU 908. The received first PDU 908 has a SEQN bit value of S, and a packet counter value of "x". However, the received first PDU 908 may cause a CRC or a MIC error at the second device despite the SEQN bit and the packet counter of the received first PDU 908 matching the expected values for the SEQN value and packet counter value. In such instance, the second device 904 may transmit a NACK 910 to the first device 902, indicating that the first PDU 906 was not properly received.

In response to receiving the NACK, the first device 902 may next transmit the second PDU 912. The second PDU 912 is a retransmission of the first PDU 906 and may be configured to have the a SEQN bit value and packet counter value that is the same as the SEQN bit value and packet counter value of the first PDU 906. As such, the second PDU 912 may have a SEQN bit value of S, and a packet counter value of "x". The second device 904 receives the second PDU 912 transmitted from the first device 902 as the received second PDU 916. However, during transmission 914 of the second PDU 912, the SEQN bit of the second PDU 912 was flipped, such that the received second PDU 916 has a SEQN bit value of $\overline{S}$ instead of the original value of S, while the packet counter has a value of "x". In this instance, the received second PDU 916 may result in a MIC pass at the second device due to the value of the received packet counter matching the expected packet counter value. However, the SEQN bit value of the received second PDU 916 has a SEQN bit value of $\overline{S}$ which does not match the expected SEQN bit value. Typically, the received second PDU 916 would be discarded because of the mismatch of the SEQN bit value and the expected SEQN bit value. However, the second device 904 may be configured to identify whether the SEQN bit of the received second PDU 916 may have been flipped during transmission 914.

In the above scenario, the SEQN bit value of $\overline{S}$ of the received second PDU 916 does not match the SEQN bit value of the last received PDU (e.g., SEQN bit value of the received first PDU 908), but the received second PDU 916 results in a MIC pass at the second device. The received second PDU 916 results in a MIC pass because the value of the packet counter of the received second PDU 916 matches the value of the expected packet counter value. Thus, when the received PDU has a value of the SEQN bit that matches or repeats the SEQN bit value of the last successfully received PDU, along with the received PDU resulting in a MIC pass at the second device, then the second device 904 may identify the SEQN bit of the received second PDU 916 as being flipped during transmission of the PDU. The second device 904 may determine that the actual SEQN bit value of the received second PDU 16 is actually S. Thus, under certain conditions, the second device may identify the SEQN bit being flipped during transmission and process the received second PDU 916 as if the SEQN bit was not flipped. After identifying the SEQN bit as a flipped SEQN bit, the second device 904 may change the SEQN bit value to the correct or expected SEQN bit value, process the received second PDU 916 and transmit the ACK 918. In some aspects the second device 904 may not change the SEQN bit value to the correct or expected SEQN bit value, after identifying the SEQN bit as a flipped SEQN bit, but instead may process the received second PDU 916 with the understanding that the SEQN bit was flipped and the actual value of the SEQN bit matches the expected SEQN bit value. The second device 904 may also increment the expected values for the SEQN bit and the packet counter in preparation of receiving the next PDU.

The first device 902 may prepare and transmit the next PDUs (e.g., 920, 926) in a manner similarly as discussed in the aspect of FIG. 8. FIG. 9 provides an example of the corrective measures that may be utilized by the second device 904. The second device 904 may understand that receiving a new SEQN bit value after transmitting a NACK may occur because of the SEQN bit being flipped during transmission of the retransmitted data packet. The second device 904 did not properly receive the first PDU and is expecting to receive the SEQN bit value and packet counter value corresponding to the SEQN bit value and packet counter value of the first PDU. When the second device 904 is expecting the first PDU to be retransmitted, but instead receives a PDU having a new or incremented SEQN bit value but passes MIC, then the second device 904 may determine that the new or incremented SEQN bit value is received due to the SEQN bit being flipped in transmission. Identifying the SEQN bit as a flipped bit allows the second device 904 to take corrective action to recover the SEQN bit value transmitted and prevent a MIC error due to the SEQN bit value being flipped. The second device 904 may maintain the link with the first device 902 by ensuring that the packet counters between the first device 902 and second device 904 do not lose synchronization. The corrective actions may be able to correct the MIC errors due to the SEQN bit value being flipped during transmission. The corrective actions may thereby prevent repeated MIC errors which would lead to link loss. The corrective actions may allow the next or subsequent PDUs (e.g., 926) to be properly transmitted and received (e.g., 928).

Figure 10:
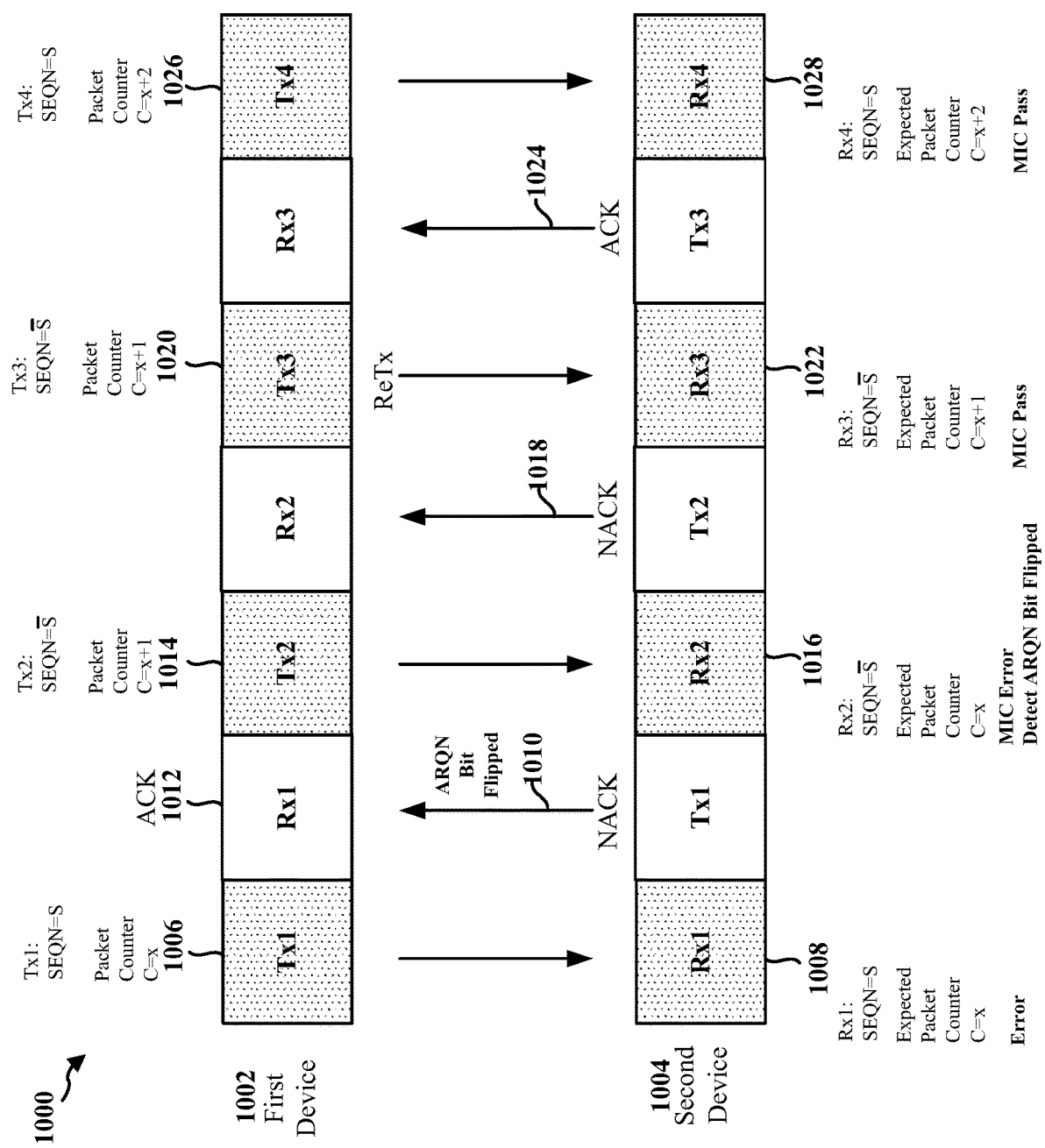
FIG. 10 is a diagram illustrating a wireless communication between a master device and a slave device, in accordance with certain aspects of the disclosure.

FIG. 10 illustrates a data flow 1000 for communications between a first device 1002 and a second device 1004 in a WPAN in accordance with certain aspects of the disclosure. The first device 1002 may correspond to a master device, and the second device 1004 may correspond to a slave device. The first device or master device 1002 may correspond to, e.g., the wireless device 102, peripheral device 104, 106, 110, 112, 114, wireless device 200, 802, 804, 902, 904, 1002, 1004, 1102, 1104, 1202, 1204, 1450, or the apparatus 1402/1402'. The second device or slave device 1004 may correspond to, e.g., the wireless device 102, peripheral device 104, 106, 110, 112, 114, wireless device 200, 802, 804, 902, 904, 1002, 1004, 1102, 1104, 1202, 1204, 1450, or the apparatus 1402/1402'. FIG. 10 provides a scenario where an ARQN bit is flipped during transmission along with corrective actions that may be utilized to maintain the link.

The first device 1002 may transmit a first PDU 1006. The first PDU 1006 may be configured to have a SEQN bit value of S, and a packet counter value of "x". The second device 1004 receives the first PDU 1006 transmitted from the first device 1002 as the received first PDU 1008. The received first PDU 1008 has a SEQN bit value of S, and a packet counter value of "x". However, the received first PDU 1008 may cause a CRC error or a MIC error at the second device despite the SEQN bit value and the packet counter value of the received first PDU 1008 matching the expected values for the SEQN bit value and packet counter value. In response, the second device 1004 may transmit a NACK 1010 to the first device 1002, indicating that the first PDU 1006 was not properly received. However, during transmission, the value of the ARQN bit of the NACK 1010 became corrupted and flipped values, such that the first device 1002 received the NACK 1010 as an ACK 1012. As such, the first device 1002 processes the ACK 1012 and operates under the assumption that the first PDU 1006 was properly received.

The first device 1002 may next transmit the second PDU 1014, a new data packet and not a retransmission of the first PDU 1006. Since the second PDU 1014 is a new packet, the first device may configure the second PDU 1014 to have the SEQN bit inverted from the last SEQN bit value and the packet counter value incremented from the prior packet counter value due to receiving the ACK 1012. As such, the second PDU 1014 may have a SEQN bit value of $\overline{S}$, and a packet counter value of "x+1". The flipped ARQN bit causes the NACK 1010 transmitted from the second device 1004 to be received as an ACK 1012 by the first device 1002, which in turn causes the first device 1002 to not retransmit the first PDU 1006 and instead transmit a new PDU as the second PDU 1014. The second device 1004 receives the second PDU 1014 transmitted from the first device 1002 as the received second PDU 1016. The second device 1004 is expecting to receive a retransmission of the first PDU 1006 as the received second PDU 1016, such that the received second PDU 1016 is expected to have a SEQN bit value of S, with the packet counter value of "x", corresponding to the values for a retransmission of the first PDU 1006. However, the received second PDU 1016 has a SEQN bit value of $\overline{S}$ and packet counter value of "x+1" (the values for a new packet). The received second PDU 1016 results in a MIC failure at the second device due to the value of the received packet counter value of "x+1" not matching the expected packet counter value of "x". In certain instances, the MIC error may be ignored, since the received second PDU would have a SEQN bit value that is the same as the SEQN bit value of the last successfully received PDU, such that the second PDU would be discarded and the second PDU would be acknowledged, but doing so would result in repeated MIC errors and lead to link loss. However, the second device 1004 may be configured to determine whether the ARQN bit of the NACK was properly received, such that if the ARQN bit was not properly received then the ARQN bit may have been flipped during transmission 1010.

As illustrated by the scenario depicted in FIG. 10, the SEQN bit value of $\overline{S}$ of the received second PDU 1016 is not the same as the last received SEQN bit value of the last PDU (e.g., SEQN bit value of the received first PDU 1008), while having a MIC failure at the second device. The received second PDU 1016 has a MIC failure because the received second PDU 1016 has a value of "x+1" for the packet counter value which does not match the value of "x" for the expected packet counter value. Thus, when the received PDU has a new or incremented SEQN bit value with respect to the last received PDU, and has a MIC failure, then the ARQN bit of the NACK was not properly received by the first device. As such, when the value of the SEQN bit does not match the value of the last received SEQN bit, along with the received PDU resulting in a MIC failure at which the second device, then the second device 1004 may identify the ARQN bit of the NACK 1010 as a flipped bit. When the second device 1004 identifies the ARQN bit was not properly received by the first device or is a flipped ARQN bit, the second device 1004 may take corrective actions to overcome the MIC failure to maintain the link with the first device 1002.

In some aspects, after identifying that the ARQN bit was flipped during transmission or that the NACK was not properly received, the second device 1004 may discard the packet, NACK the packet, and adjust the expected values for the SEQN bit and the packet counter. For example, the second device 1004 may determine that the ARQN bit of the NACK 1010 was flipped during transmission, such that the NACK 1010 was not properly received by the first device 1002. As such, the second device 1004 may discard the received second PDU 1016. The second device 1004 may then transmit a NACK 1018 to indicate that the second PDU 1014 was not properly received.

In some aspects, the second device 1004 may further define a new expected packet counter value. In some aspects, the second device 1004 may define the new expected packet counter value by incrementing the expected packet counter value by 1. For example, the expected packet counter value for the second PDU 1014 was "x", and the second device 1004 may define the new expected packet counter value by incrementing the expected packet counter value by 1 which would define the new expected packet counter value as "x+1". The new expected packet counter value of "x+1" would be assigned as the expected value of the packet counter for the next received packet or the third PDU 1020.

In some aspects, the second device 1004 may further define a new expected SEQN bit when the above scenario occurs. The new expected SEQN bit value may be assigned as the expected SEQN bit for the next PDU. In some aspects, after the second device 1004 identifies the ARQN bit as a flipped bit the second device 1004 may define the new expected SEQN bit value by incrementing the value of the SEQN bit of the last received PDU. For example, the second device 1004 may define the value of the new expected SEQN bit by incrementing the value of the SEQN bit of the received first PDU 1008. In such example, the new expected SEQN bit may be set to $\overline{S}$, such that the expected SEQN bit for the third PDU may be set to $\overline{S}$.

The first device 1002 may then transmit the third PDU 1020 in response to receiving the NACK 1018. The third PDU 1020 may not be a new packet, but may be a retransmission of the second PDU 1014. The third PDU 1020 may be configured to have the SEQN bit and packet counter values of the second PDU 1014. The third PDU 1020 may be configured to have a SEQN bit value of $\overline{S}$ and may be configured to have a packet counter value of "x+1", which corresponds to the SEQN bit and packet counter of the second PDU 1014. The second device 1004 receives the third PDU 1020 from the first device 1002 as a received third PDU 1022.

The second device 1004 may have an expected SEQN bit value for the received third PDU 1022, determined as part of the corrective actions taken by the second device 1004, as discussed above. As such, the second device 1004 may be expecting to receive the third PDU 1022 having a SEQN bit value of $\overline{S}$. In some aspects, the expected SEQN bit for the received third PDU 1022 may be defined by the second device 1004, under certain conditions. For example, in some aspects, the expected SEQN bit for the received third PDU 1022 may be defined by the second device 1004 when the second device 1004 identifies the ARQN bit as a flipped bit, as discussed above. In some aspects, the expected SEQN bit for the received third PDU 1022 may be defined by the second device 1004 when the second device 1004 determines that a NACK was not properly received by the first device 1002.

The second device 1004 may have an expected packet counter value for the received third PDU 1022, which is determined as part of the corrective actions taken by the second device 1004, as discussed above. As such, the second device 1004 may be expecting to receive the third PDU 1022 having a packet counter value of "x+1". In some aspects, the expected packet counter for the received third PDU 1022 may be defined by the second device 1004, under certain conditions. For example, in some aspects, the expected packet counter for the received third PDU 1022 may be defined by the second device 1004 when the second device 1004 identifies the ARQN bit as a flipped bit, as discussed above. In some aspects, the expected packet counter for the received third PDU 1022 may be defined by the second device 1004 when the second device 1004 determines that a NACK was not properly received by the first device 1002.

Referring back to the aspect of FIG. 10, the received third PDU 1022 has a SEQN bit value of $\overline{S}$ and a packet counter value of "x+1" which matches the expected values of the SEQN bit and the packet counter. As such, the received third PDU 1022 may have a MIC pass due to the packet counter matching the expected packet counter. The second device 1004 may process the received third PDU 1022 and transmit an ACK 1024 to the first device 1002. The first device 1002 may then transmit the fourth PDU 1026. The second device 1004 receives the fourth PDU 1026 as a received fourth PDU 1028. The SEQN bit and the packet counter of the received fourth PDU 1028 may match the expected SEQN bit and the expected packet counter, as such the received fourth PDU 1028 may have a MIC pass.

The corrective actions taken by the second device 1004 allows the second device 1004 to recover from the ARQN bit being flipped, as well as preventing repeated MIC errors. The corrective actions taken by the second device 1004 allows the link between the first device 1002 and the second device 1004 to be maintained. However, in performing the corrective actions, the data packet that was not properly received and caused a NACK to be transmitted but received as an ACK may be lost. For example, in the aspect of FIG. 10, the first PDU 1006 was not properly received and the NACK 1010 was sent to the first device 1002, but the NACK 1010 experienced an ARQN bit flip and the NACK 1010 was received as the ACK 1012. Part of the corrective actions taken by the second device 1004 to overcome the ARQN bit flip may include defining a new packet counter by incrementing the packet counter by 1 (e.g., "x+1"). As a result of incrementing the packet counter by 1, the first PDU 1006 associated with the previous packet counter (e.g., "x") is lost. Although a PDU may be lost, which may cause an audible glitch in audio transmissions, at least one advantage is that the receiving device may overcome bit errors and prevent repeated MIC errors, such that the link is preserved.

Figure 11:
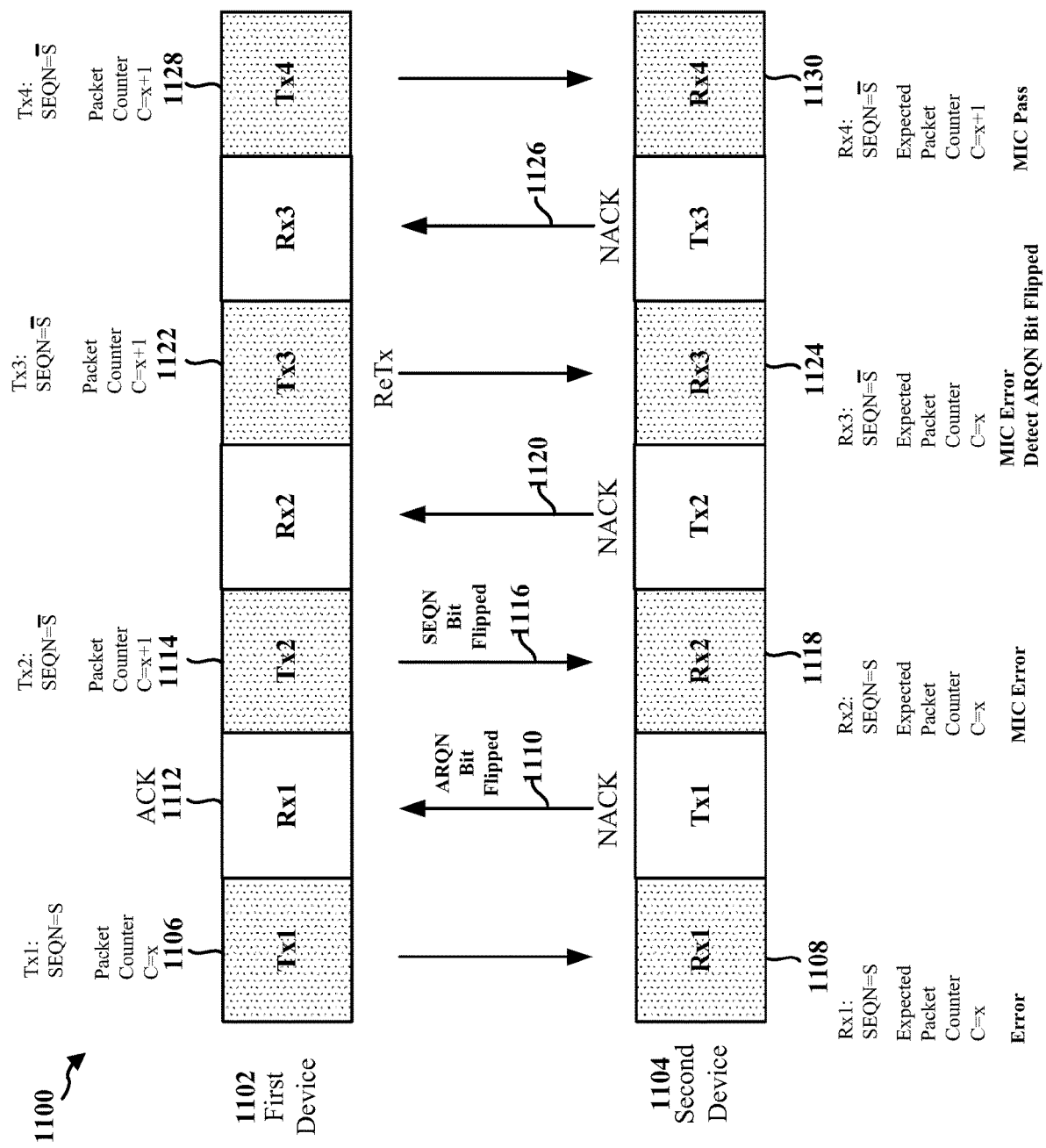
FIG. 11 is a diagram illustrating a wireless communication between a master device and a slave device, in accordance with certain aspects of the disclosure.

FIG. 11 illustrates a data flow 1100 for communications between a first device 1102 and a second device 1104 in a WPAN in accordance with certain aspects of the disclosure. The first device 1102 may correspond to a master device, and the second device 1104 may correspond to a slave device. The first device or master device 1102 may correspond to, e.g., the wireless device 102, peripheral device 104, 106, 110, 112, 114, wireless device 200, 802, 804, 902, 904, 1002, 1004, 1102, 1104, 1202, 1204, 1450, or the apparatus 1402/1402'. The second device or slave device 1104 may correspond to, e.g., the wireless device 102, peripheral device 104, 106, 110, 112, 114, wireless device 200, 802, 804, 902, 904, 1002, 1004, 1102, 1104, 1202, 1204, 1450, or the apparatus 1402/1402'. FIG. 11 illustrates a scenario where an ARQN bit is flipped during transmission, a SEQN bit is flipped during transmission, and corrective actions that may be utilized to maintain the link.

The first device 1102 may transmit a first PDU 1106. The first PDU 1106 may be configured to have a SEQN bit value of S, and a packet counter value of "x". The second device 1104 receives the first PDU 1106 transmitted from the first device 1102 as the received first PDU 1108. The received first PDU 1108 has a SEQN bit value of S, and a packet counter value of "x". However, the received first PDU 1108 may experience a CRC error or a MIC error despite the SEQN bit value and the packet counter value of the received first PDU 1108 matching the expected values for the SEQN value and packet counter value. In response, the second device 1104 may transmit a NACK 1110 to the first device 1102, indicating that the first PDU 1106 was not properly received. However, during transmission, the value of the ARQN bit of the NACK 1110 became corrupted and flipped values, such that the first device 1102 received the NACK 1110 as ACK 1112. As such, the first device 1102 processes the ACK 1112 and operates under the assumption that the first PDU 1106 was properly received.

The first device 1102 may next transmit the second PDU 1114 with a new data packet and not as a retransmission of the first PDU 1106. The second PDU 1114 is a new packet and may be configured to have the value of its SEQN bit inverted and the packet counter value incremented due to receiving the ACK 1112. As such, the second PDU 1114 may have a SEQN bit value of $\overline{S}$, and a packet counter value of "x+1". That is, the flipped ARQN bit causes the NACK 1110 transmitted from the second device 1104 to be received as an ACK 1112 by the first device 1102, which in turn causes the first device 1102 to not retransmit the first PDU 1106 and instead move on to transmission of a new PDU for the second PDU 1114. The second device 1104 receives the second PDU 1114 transmitted from the first device 1102 as received second PDU 1118. The second device 1104 is expecting to receive a retransmission of the first PDU 1106 in the second PDU 1118. Thus the second device expects that the received second PDU 1118 has a SEQN bit value of S, with the packet counter having a value of "x", corresponding to the retransmission of the first PDU 1106. However, the second PDU 1114 is a new data packet that has a new or incremented SEQN bit value and new or incremented packet counter value. During transmission 1116 of the second PDU 1114, the SEQN bit of the second PDU became flipped, such that the received second PDU 1118 has a SEQN bit value of S and a packet counter value of "x+1". The second device 1104 may be expecting to receive a retransmission of the first PDU 1106 in the form of the received second PDU 1118, such that the received second PDU 1118 has a SEQN bit value of S, with the packet counter having a value of "x", corresponding to the retransmission of the first PDU 1106. However, the received second PDU is a new data packet and has a SEQN bit value of S (instead of $\overline{S}$ due to the SEQN bit flip) and new packet counter value of "x+1". The received second PDU 1118 has a SEQN bit value the matches the expected SEQN bit value, but the received second PDU 1118 has a packet counter value of "x+1" which does not match the expected packet counter value of "x". The received second PDU 1118 may result in a MIC failure at the second device due to the received packet counter value not matching the expected packet counter value. The second device 1104 was expecting to receive a retransmission of the first PDU 1106, but the packet counter value of the received second PDU 1118 being incremented indicates that a new sequence might have been transmitted by the first device 1102 instead of a retransmission. The second device 1104 may be configured to determine whether the ARQN bit of the NACK was properly received by the first device, such that if the ARQN bit was not properly received then the ARQN bit may have been flipped during transmission and/or whether the SEQN bit might have been flipped during transmission.

As depicted in FIG. 11, the received second PDU 1118 may have a SEQN bit value of S, which repeats the SEQN bit of the last received PDU (e.g., 1108) and in some instances the repetition of SEQN bit value may be considered as a retransmission. However, the value of packet counter of the received second PDU 1118 is "x+1" which indicates that the packet counter has been incremented, and a packet counter incremented by 1 over the value of the packet counter of the last received PDU may be indicative of a new packet transmission. Thus, an error may have occurred during transmission. The second device 1104 may be configured to implement corrective actions in order to overcome certain errors and to maintain the link with the first device 1102. In some aspects, the second device 1104 may be configured to determine that the received second PDU 1118 may be a new packet because the value of the packet counter of the received second PDU 1118 is "x+1" which is an incremented value over the expected packet counter value of "x". In some aspects, the second device 1104 may determine that the SEQN bit may have flipped during transmission 1116 of the second PDU 1114. In such aspects, corrective actions that the second device 1104 may implement may be to NACK the second PDU a maximum of N consecutive times, where N may be 1 or greater than 1, or until the expected SEQN bit value is successfully received. In some aspects, transmitting the NACK one or more times may result in receiving the expected SEQN bit value. However, in some aspects, the successful reception of the expected SEQN bit value may not be achieved by transmitting the NACK one or more times. In such instances, the second device 1104 may determine that the ARQN bit of the NACK might have flipped during transmission. In such instances, the second device 1104 may NACK the packet (e.g., the received second PDU 1118). The NACK 1120 may be transmitted by the second device 1104 to the first device 1102, such that the first device prepares to transmit a third PDU 1122 when the NACK 1120 is received by the first device.

The third PDU 1122 may be a retransmission of the second PDU 1114, and have the same SEQN bit value (e.g., S) and packet counter value (e.g., "x+1") as the second PDU 1114. The second device 1104 receives the third PDU 1122 as a received third PDU 1124. The received third PDU 1124 may have a SEQN bit value of $\overline{S}$ and a packet counter value of "x+1". The second device may be expecting to receive a SEQN bit value of S and may be expecting to receive a packet counter value of "x". The received third PDU 1124 may result in a MIC failure at the second device due to the packet counter value not matching the expected packet counter value. However, the SEQN bit value of the received third PDU 1124 does not match the expected SEQN bit value. Thus, the received third PDU may include a new sequence (e.g., incremented SEQN bit value) or new data packet in response to a NACK, and also result in a MIC failure at the second device. As discussed above, in reference to FIG. 10, when the received PDU is a new sequence or new data packet with respect to the last received sequence or data packet, and has a MIC failure, then the ARQN bit of a NACK was not properly received by the first device. As such, when the value of the SEQN bit does not match the value of the last received SEQN bit, along with the received PDU having a MIC failure, then the second device 1104 may identify the ARQN bit of a NACK as a flipped bit. When the second device 1104 identifies the ARQN bit was not properly received by the first device or is a flipped ARQN bit, the second device 1104 may take corrective actions to overcome the MIC failure to maintain the link with the first device 1102.

In some aspects, after identifying that a ARQN bit is a flipped bit or that a NACK was not properly received, the second device 1104 may discard the packet (e.g., third PDU), NACK the packet (e.g., third PDU), and adjust the expected values for the SEQN and the packet counter. For example, the second device 1104 may determine that the ARQN bit of a NACK (e.g., NACK 1110) is a flipped bit, such that the NACK was not properly received by the first device 1102. As such, the second device 1104 may discard the received third PDU 1124, and the second device 1104 may then transmit a NACK 1126 to indicate that the third PDU 1122 was not properly received. The second device 1104 may then define the values of the SEQN bit and packet counter for the next PDU (e.g., 1128) by incrementing the values of the SEQN bit and packet counter of the last received PDU (e.g., 1118). In the aspect of FIG. 11, the expected SEQN bit value for the fourth PDU may be $\overline{S}$ and the expected packet counter value for the fourth PDU may be "x+1".

In some aspects, the second device 1104 may further define a new expected packet counter value as described above in the aspect of FIG. 10. In some aspects, the second device 1104 may further define a new expected SEQN bit as described above in the aspect of FIG. 10.

The first device 1102 may then transmit the fourth PDU 1128 in response to receiving the NACK 1126. The fourth PDU 1128 may not be a new packet, but may be a retransmission of the third PDU 1122. The fourth PDU 1128 may be configured to have the same SEQN bit and packet counter values as the third PDU 1122. That is, the fourth PDU 1128 may be configured to have a SEQN bit value of $\overline{S}$ and may be configured to have a packet counter value of "x+1", which corresponds to the SEQN bit and packet counter values of the third PDU 1122. The second device 1104 receives the fourth PDU 1128 from the first device 1102 as a received fourth PDU 1130.

The second device 1104 may have an expected SEQN bit value for the received fourth PDU 1130, as part of the corrective actions taken by the second device 1104, as discussed above. As such, the second device 1104 may be expecting to receive the fourth PDU 1128 with a SEQN bit value of $\overline{S}$. In some aspects, the expected SEQN bit value for the received fourth PDU 1130 may be defined by the second device 1104, under certain conditions. For example, in some aspects, the expected SEQN bit for the received fourth PDU 1130 may be defined by the second device 1104 when the second device 1104 identifies the ARQN bit as a flipped bit, as discussed above. In some aspects, the expected SEQN bit for the received fourth PDU 1130 may be defined by the second device 1104 when the second device 1104 determines that a NACK was not properly received by the first device 1102.

The second device 1104 may have an expected packet counter value for the received fourth PDU 1130, that is determined as part of the corrective actions taken by the second device 1104, discussed above. As such, the second device 1104 may be expecting to receive the fourth PDU 1130 with a packet counter value of "x+1". In some aspects, the expected packet counter for the received fourth PDU 1130 may be defined by the second device 1104, under certain conditions. For example, in some aspects, the expected packet counter for the received fourth PDU 1130 may be defined by the second device 1104 when the second device 1104 identifies the ARQN bit as a flipped bit, as discussed above. In some aspects, the expected packet counter for the received fourth PDU 1130 may be defined by the second device 1104 when the second device 1104 determines that a NACK was not properly received by the first device 1102.

The received fourth PDU 1130 has a SEQN bit value of $\overline{S}$ and a packet counter value of "x+1" which matches the expected values of the SEQN bit and the packet counter. As such the received fourth PDU 1130 may result in a MIC pass at the second device due to the received packet counter value matching the expected packet counter value. The second device 1104 may process the received fourth PDU 1130 and transmit an ACK to the first device 1102. The first device 1102 may then transmit the next and/or subsequent PDUs, and the second device 1104 may receive the next and/or subsequent PDUs and transmit an ACK or NACK.

The corrective actions taken by the second device 1104 allows the second device 1104 to recover from the ARQN bit being flipped and/or a SEQN bit being flipped, as well as preventing repeated MIC errors at the second device. The corrective actions taken by the second device 1104 allows the link between the first device 1102 and the second device 1104 to be maintained. However, in performing the corrective actions, the data packet that was not properly received and caused a NACK to be transmitted but received as an ACK may be lost. For example, in the aspect of FIG. 11, the first PDU 1106 was not properly received and the NACK 1110 was sent to the first device 1102, but the NACK 1110 experienced an ARQN bit flip and the NACK 1110 was received as the ACK 1112, similarly as discussed in the aspect of FIG. 10. Part of the corrective actions taken by the second device 1104 to overcome the ARQN bit flip may include defining a new packet counter by incrementing the packet counter by 1 (e.g., "x+1"). As a result of incrementing the packet counter by 1, the first PDU 1106 associated with the previous packet counter (e.g., "x") is lost. Although a PDU may be lost, which may cause an audible glitch in audio transmissions, at least one advantage is that the receiving device may overcome bit errors and prevent repeated MIC errors, such that the link is preserved.

Figure 12:
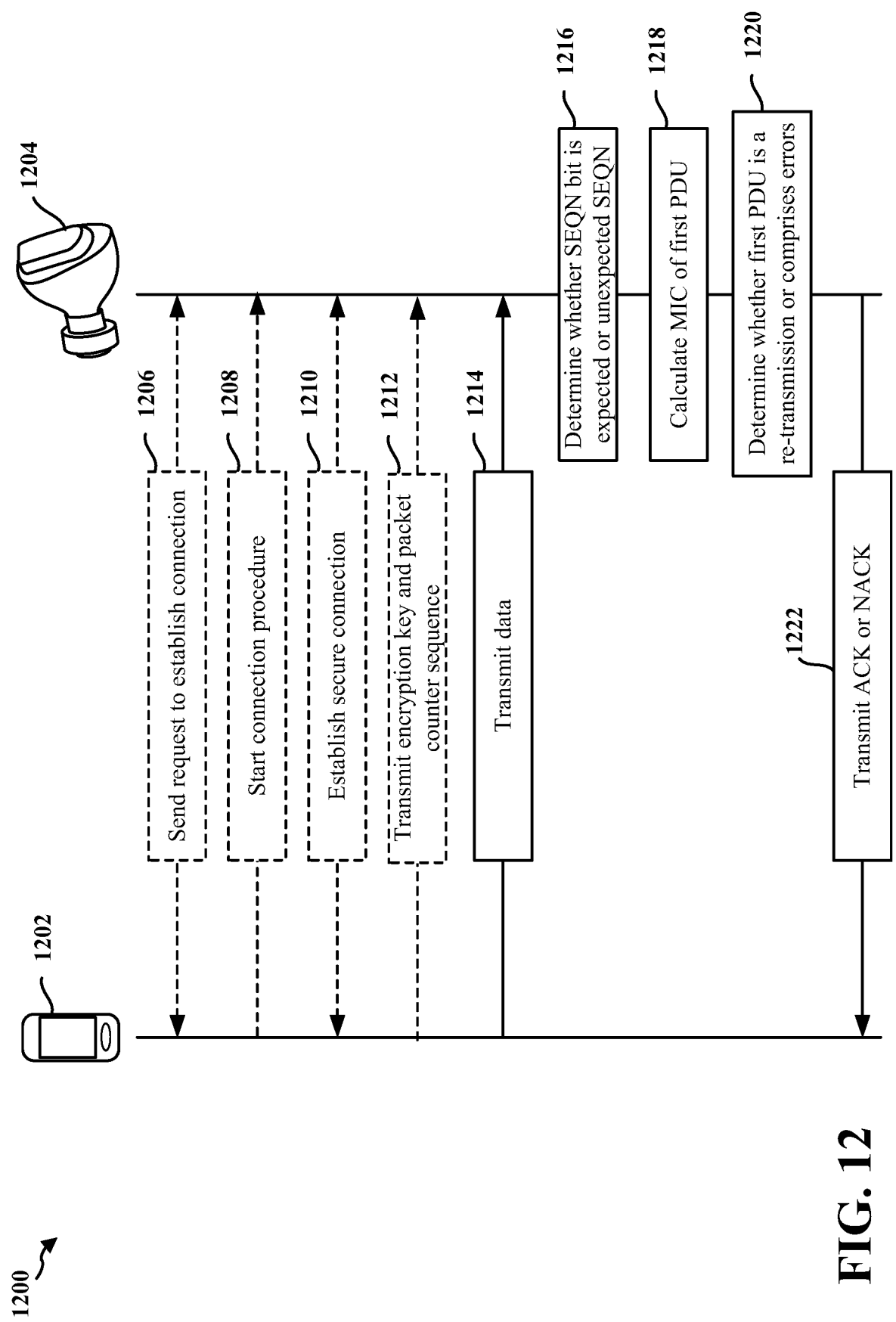
FIG. 12 is a data flow that may be used to establish a connection between a master device and a slave device over a short-range wireless communications link, in accordance with certain aspects of the disclosure.

FIG. 12 is a data flow 1200 that may be used to establish a connection between a master device and a slave device over a short-range wireless communications link, in accordance with certain aspects of the disclosure. First device 1202 may correspond to the master device, and second device 1204 may correspond to the slave device. First device or master device 1202 may correspond to, e.g., the wireless device 102, peripheral device 104, 106, 110, 112, 114, wireless device 200, 802, 804, 902, 904, 1002, 1004, 1102, 1104, 1202, 1204, 1450, or the apparatus 1402/1402'. Second device or slave device 1204 may correspond to, e.g., the wireless device 102, peripheral device 104, 106, 110, 112, 114, wireless device 200, 802, 804, 902, 904, 1002, 1004, 1102, 1104, 1202, 1204, 1450, or the apparatus 1402/1402'.

In some aspects, at 1206, at least one of the first device 1202 or the second device 1204 may send a request to establish a connection. In some aspects, the master or first device 1202 may initiate the connection requests with slave devices. In some aspects, the slave or second device 1204 may initiate the connection request with a master device.

At 1208, the first device 1202 may start the connection procedure with the second device 1204. The first device 1202 may transmit one or more signals to the second device 1204 in order to initiate or commence the connection procedure.

At 1210, the first and second devices 1202, 1204 may communicate with each other to establish a secure connection between each other.

At 1212, the first device 1202 may be configured to transmit an encryption key and a packet counter sequence to the second device 1204. In some aspects, the encryption key may be based on the packet counter sequence, such that the second device may properly decrypt data when the packet counter sequence between the first and second devices 1202, 1204 are synchronized.

The first device 1202 may be configured to transmit data 1214 to the second device 1204, such that the second device receives a first PDU comprising at least a SEQN bit. The first device 1202 may be configured to transmit one or more data packets to the second device 1204. The first device 1202, using the packet counter, may derive a nonce which is then used to encrypt the packet at the transmission end, such that the receiver or the second device 1204 may use the same packet counter to derive the nonce and decrypt the packet successfully.

At 1216, the second device 1204 may be configured to determine whether the value of the SEQN bit of the received first PDU is an expected SEQN or an unexpected SEQN.

At 1218, the second device 1204 may be configured calculate a MIC of the received first PDU. The MIC may be calculated based on the packet counter value.

At 1220, the second device 1204 may be configured to determine whether the received first PDU is a re-transmission of a previous PDU or the received first PDU comprises errors. Determining whether the first PDU is the re-transmission or comprises errors may be based on the determination that the value of the SEQN bit is the unexpected SEQN.

At 1222, the second device 1204 may be configured to transmit an ACK or a NACK in response to the determination of whether the first PDU is a re-transmission of the previous PDU or whether the first PDU is received without any error. In some aspects, in determining whether the received first PDU is the re-transmission of the previous PDU, the second device may be configured to determine whether at least undencrypted MIC octets of the first PDU match undencrypted MIC octets of the previous received PDU. If the undencrypted MIC octets of the first PDU and the undencrypted MIC octets of the previous received PDU match, then the first PDU is identified as a retransmission. In some aspects, the second device may be configured to determine whether CRC octets of the first PDU match CRC octets of the previous received PDU. If the CRC octets of the first PDU and the CRC octets of the previous received PDU match, then the first PDU is identified as a retransmission. In some aspects, the second device may be configured to determine whether the CRC octets and the MIC octets of the first PDU match that of the previous received PDU, such that if the CRC octets and the MIC octets of the first PDU and the CRC octets and the MIC octets of the previous received PDU match, then the first PDU is identified as a retransmission, otherwise the first PDU is treated as a new transmission. In some aspects, the second device may be configured to identify the first PDU as the re-transmission of the previously received PDU when the undencrypted CRC octets of the first PDU match the undencrypted CRC octets of the previously received PDU; or when the MIC octets of the first PDU match the MIC octets of the previously received PDU; or when both the CRC octets and undencrypted MIC octets of the first PDU match the undencrypted MIC octets and the CRC octets the previous received PDU. In some aspects, transmitting the ACK or NACK comprises transmitting the ACK and discarding the first PDU, when the first PDU is determined to be the re-transmission of the previously received PDU. The determination of a re-transmission may be determined when an unexpected SEQN is received and when the MIC result fails, such as, for example in case 3 of Table 1. However, there may be other instances in which the determination of the re-transmission may be determined and the disclosure is not intended to be limited to the aspects disclosed herein. In some aspects, transmitting the ACK or NACK may comprise transmitting the ACK upon the determination of the re-transmission regardless of whether or not the re-transmission has errors.

In some aspects, the second device 1204 may be configured to identify the first PDU as a new PDU having errors. For example, the second device may determine if an unexpected SEQN is received with the reception of the first PDU. Upon the determination that an unexpected SEQN is received, the second device 1204 may determine if the first PDU is a retransmission by matching the CRC octets and/or the undencrypted MIC octets (as discussed above) with the previous successfully received packet. If these match, then the first PDU is a retransmission. However, when the first PDU is determined to not match any of the undencrypted MIC octets and/or the CRC octets of the previously received PDU, then the first PDU may be considered as being a new PDU having errors. In some aspects, the new PDU having errors may be identified as having at least a SEQN bit error, in instances other than when an unexpected SEQN is received. In such aspects, the second device 1204 may be configured to transmit a maximum of N consecutive NACKs, where N≥0, or until the expected SEQN is successfully received. In some aspects, the second device 1204 may be configured to transmit an ACK after the transmission of at least one of the N consecutive NACKs, when the expected SEQN is successfully received. In some aspects, the second device 1204 may be configured to determine the presence of an ARQN bit error when the expected SEQN is not successfully received after the N consecutive NACKs. Each of the N consecutive NACKs may comprise an ARQN bit to indicate that the corresponding packet was not properly received. In some aspects, the second device 1204 may be configured to transmit a NACK in response to the identification of the first PDU as having the ARQN bit error. The second device 1204 may be configured to switch the value of the expected SEQN to an opposite value. The second device 1204 may be configured to increment the packet counter value by 1.

Figure 13:
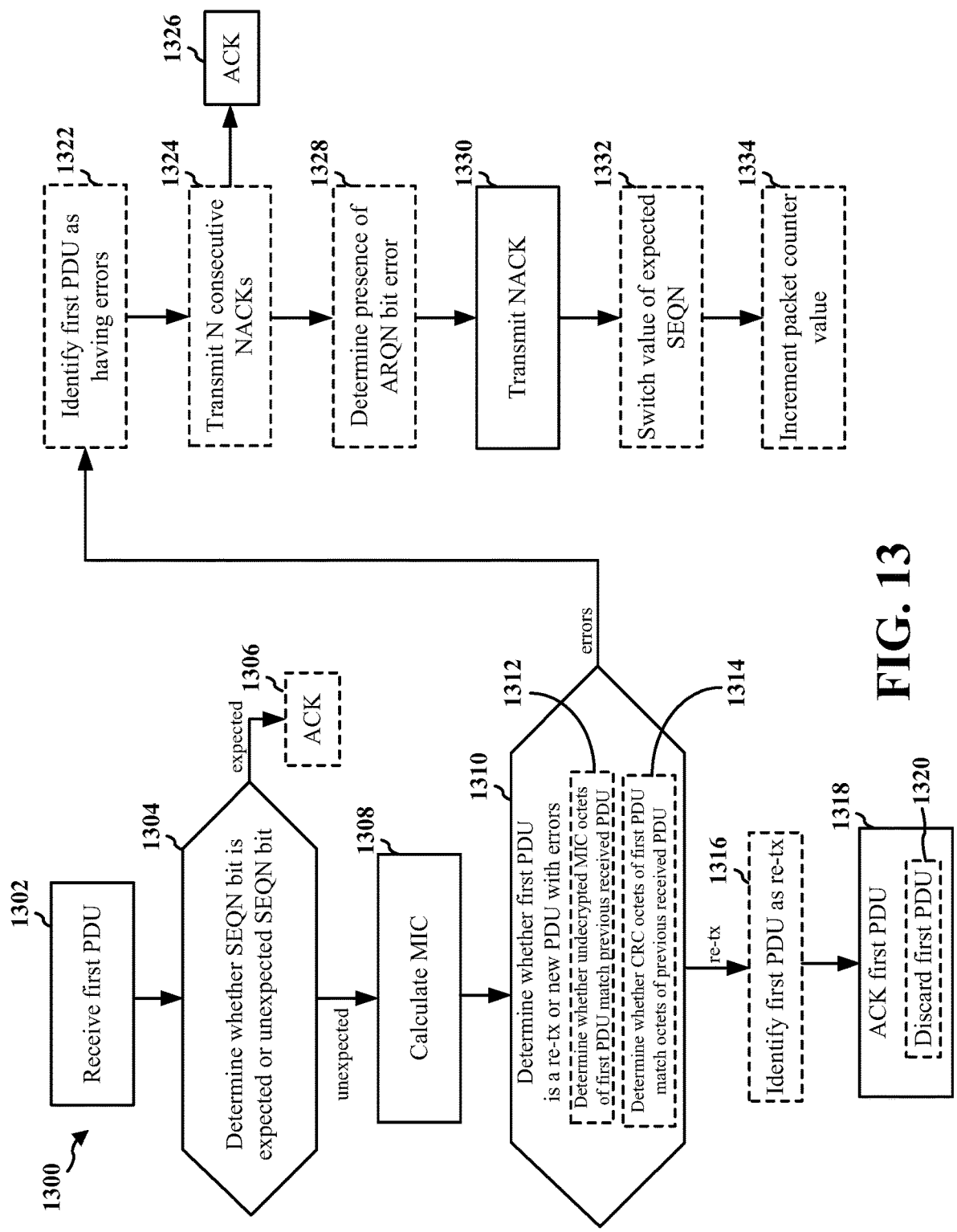
FIG. 13 is a flowchart of a method of wireless communication, in accordance with certain aspects of the disclosure.

FIG. 13 is a flowchart 1300 of a method of wireless communication, in accordance with certain aspects of the disclosure. The method may be performed by a second or slave device (e.g., the wireless device 102, peripheral device 104, 106, 110, 112, 114, wireless device 200, 802, 804, 902, 904, 1002, 1004, 1102, 1104, 1202, 1204, 1450; the apparatus 1402/1402'; the processing system 1514) in wireless communication with a first or master device (e.g., the wireless device 102, peripheral device 104, 106, 110, 112, 114, wireless device 200, 802, 804, 902, 904, 1002, 1004, 1102, 1104, 1202, 1204, 1450; the apparatus 1402/1402'; the processing system 1514). One or more of the illustrated operations may be omitted, transposed, or contemporaneous. The second or slave device may implement the method of diagram 1200. Optional aspects are illustrated with dashed lines. Aspects of the method may help a receiving device to overcome bit errors (e.g., SEQN bit flip or ARQN bit flip) and maintain a communication link with a transmitting device.

Referring to FIG. 13, the first device or master device may transmit a set of packets to the second or slave device, such that, at 1302, the second device or slave device receives a first PDU (e.g., 806, 906, 1006, 1106) from the first device, as shown in the aspects of FIGS. 8-11. For example, 1302 may be performed by reception component 1404 of apparatus 1402. In some aspects the first PDU may include a SEQN bit. The set of packets may include a plurality of PDUs (e.g., 806, 812, 820, 826, 906, 912, 920, 926, 1006, 1014, 1020, 1026, 1106, 1114, 1122, 1128). The transmitter or first device, using the packet counter, may derive a nonce which is then used to encrypt the packet at the transmission end, such that the receiver or the second device may use the same packet counter to derive the nonce and decrypt the packet successfully For example, the plurality of PDUs may be transmitted using a BT protocol as shown in the aspects of FIGS. 8-11. According to various aspects, one or more of the illustrated operations of the method 1300 may be omitted, transposed, and/or contemporaneously performed. Optional aspects are illustrated with a dashed line.

At 1304, the second device or slave device may determine whether a value of the SEQN bit of the first PDU is an expected SEQN or an unexpected SEQN. For example, 1304 may be performed by SEQN value component 1406 of apparatus 1402. In some aspects, such as in FIG. 12, after establishing the secure connection 1210 between the master device 1202 and the slave device 1204, the master device 1202 may transmit an encryption key and a packet counter sequence 1212, such that the master and slave devices may be synchronized and the SEQN bit is initialized. In some aspects, the SEQN bit may be initialized to a default value used at the start of transmission of a sequence of packets. In some aspects, the expected SEQN bit may be one of two possible values. In some aspects, an ACK 1306 may be sent when the expected SEQN bit is received and there is a MIC pass and a CRC pass. It is to be understood that prior to the application of the proposed algorithm to the packets, it is assumed that all the packets have passed a header error check (HEC). In the event that there is a header error or HEC fail, the packet is ignored.

In some aspects, to determine whether the SEQN bit is the expected SEQN bit the second device or slave device may determine whether the received first PDU (e.g., 808, 908, 1008, 1108) has a MIC pass. In some aspects, the message integrity check may be based on whether the packet counter value of the first PDU matches the expected packet counter value. The first PDU may be determined to have a MIC pass when the packet counter value of the first PDU matches the expected packet counter value.

At 1308, the second device may be configured to calculate a MIC of the received first PDU. For example, 1308 may be performed by MIC component 1408 of apparatus 1402. The MIC may be calculated based on the packet counter value of the first PDU. In some aspects, the SEQN bit may be determined to be the expected SEQN bit when the comparison between the SEQN bit of the first PDU and the SEQN bit of the last successfully received PDU do not match. In some aspects, the comparison between the SEQN bit of the first PDU and of the last successfully received PDU may occur after a determination that the first PDU passes the message integrity check.

At 1310, the second device may be configured to determine whether the received first PDU is a re-transmission of a previous PDU or the received first PDU comprises errors. For example, 1310 may be performed by determination component 1410 of apparatus 1402. In some aspects, determining whether the received first PDU is the re-transmission or comprises errors may be based on the determination that the value of the SEQN bit is the unexpected SEQN. In some aspects, step 1310 may be performed prior to step 1308. For example, upon determining that the first PDU is a new PDU with errors, the second device may calculate the MIC (e.g., step 1308). In some aspects, upon determining that the first PDU is a re-transmission, calculating the MIC of the received first PDU (e.g., step 1308) may not be necessary.

In some aspects, for example, at 1312, in determining whether the received first PDU is the re-transmission of the previous PDU, the second device may be configured to determine whether at least undencrypted MIC octets of the first PDU match undencrypted MIC octets of the previous received PDU. For example, 1312 may be performed by comparison component 1412 of apparatus 1402.

In some aspects, for example, at 1314, in determining whether the received first PDU is the re-transmission of the previous PDU, the second device may be configured to determine whether CRC octets of the first PDU match CRC octets of the previous received PDU. For example, 1314 may be performed by comparison component 1412 of apparatus 1402.

At 1316, the second device may be configured to identify the first PDU as the re-transmission of the previously received PDU when the undencrypted MIC octets, the CRC octets, or both of the first PDU match the undencrypted MIC octets, the CRC octets, or both of the previous received PDU, respectively. For example, 1316 may be performed by identification component 1414 of apparatus 1402. In some aspects, the second device may be configured to identify the first PDU as the re-transmission of the previously received PDU when the undencrypted CRC octets of the first PDU match the undencrypted CRC octets of the previously received PDU. In some aspects, the second device may be configured to identify the first PDU as the re-transmission of the previously received PDU when the MIC octets of the first PDU match the MIC octets of the previously received PDU. In some aspects, the second device may be configured to identify the first PDU as the re-transmission of the previously received PDU when both the CRC octets and undencrypted MIC octets of the first PDU match the undencrypted MIC octets and the CRC octets the previously received PDU.

The second device may be configured to transmit an ACK or NACK in response to the determination of whether the first PDU is the re-transmission of the previous PDU or the first PDU comprises errors.

At 1318, for example, the second device may be configured to transmit an ACK when the first PDU is determined to be the re-transmission of the previously received PDU. For example, 1318 may be performed by re-tx ACK component 1416. In some aspects, the second device may also be configured to discard the first PDU when transmitting the ACK in response to the first PDU being determined to be the re-transmission of the previously received PDU. The ACK/NACK may be comprised within the header. The ACK/NACK may be carried with a new payload or a re-transmission from the second device to the first device. In some aspects, the ACK/NACK may be send using empty packets (e.g., POLL/NULL packets that do not contain a payload).

At 1322, the second device may be configured to identify the first PDU as a new PDU having errors. For example, 1322 may be performed by PDU error component 1418 of apparatus 1402. In some aspects, the first PDU may be identified as the new PDU having errors when the first PDU is determined to not match any of the undencrypted MIC octets and/or the CRC octets of the previous received PDU. In some aspects, the new PDU having errors may be identified as having at least a SEQN bit error.

At 1324, the second device may be configured to transmit a maximum of N consecutive NACKs where N≥0. For example, 1324 may be performed by SEQN NACKs component 1420 of apparatus 1402. The value of N may be predetermined or a configurable value. In some aspects, consecutive NACKs may be transmitted until the expected SEQN is successfully received or until the maximum of N NACKs have been transmitted, whichever happens earlier.

As discussed above, the second device may be configured to transmit an ACK or NACK in response to the determination of whether the first PDU is the re-transmission of the previous PDU or the first PDU comprises errors.

At 1326, the second device may be configured to transmit the ACK, when the expected SEQN is successfully received, after the transmission of at least one of the N consecutive NACKs. For example, 1326 may be performed by SEQN ACK component 1422 of apparatus 1402.

At 1328, the second device may be configured to determine the presence of an ARQN bit error when the expected SEQN is not successfully received after the N consecutive NACKs. For example, 1328 may be performed by ARQN error component 1424 of apparatus 1402. Each of the N consecutive NACKs may comprise an ARQN bit configured to indicate to the first or master device that the corresponding packet was not properly received by the second device. In some aspects, the ARQN bit error may occur when a PDU preceding the first PDU was improperly received by the second device, and an ARQN bit of the resultant NACK was improperly received by a peer device (e.g., first or master device). As a result, the next received PDU may comprise a MIC failure and the value of the SEQN bit of the next received PDU may not match an expected SEQN.

At 1330, the second device may be configured to transmit a NACK in response to the identification of the first PDU as having the ARQN bit error. For example, 1330 may be performed by ARQN NACK component 1426 of apparatus 1402.

At 1332, the second device may be configured to switch the value of the expected SEQN to an opposite value. For example, 1332 may be performed by switch component 1428 of apparatus 1402.

At 1334, the second device may be configured to increment the packet counter value by 1. For example, 1334 may be performed by increment component 1430 of apparatus 1402.

Figure 14:
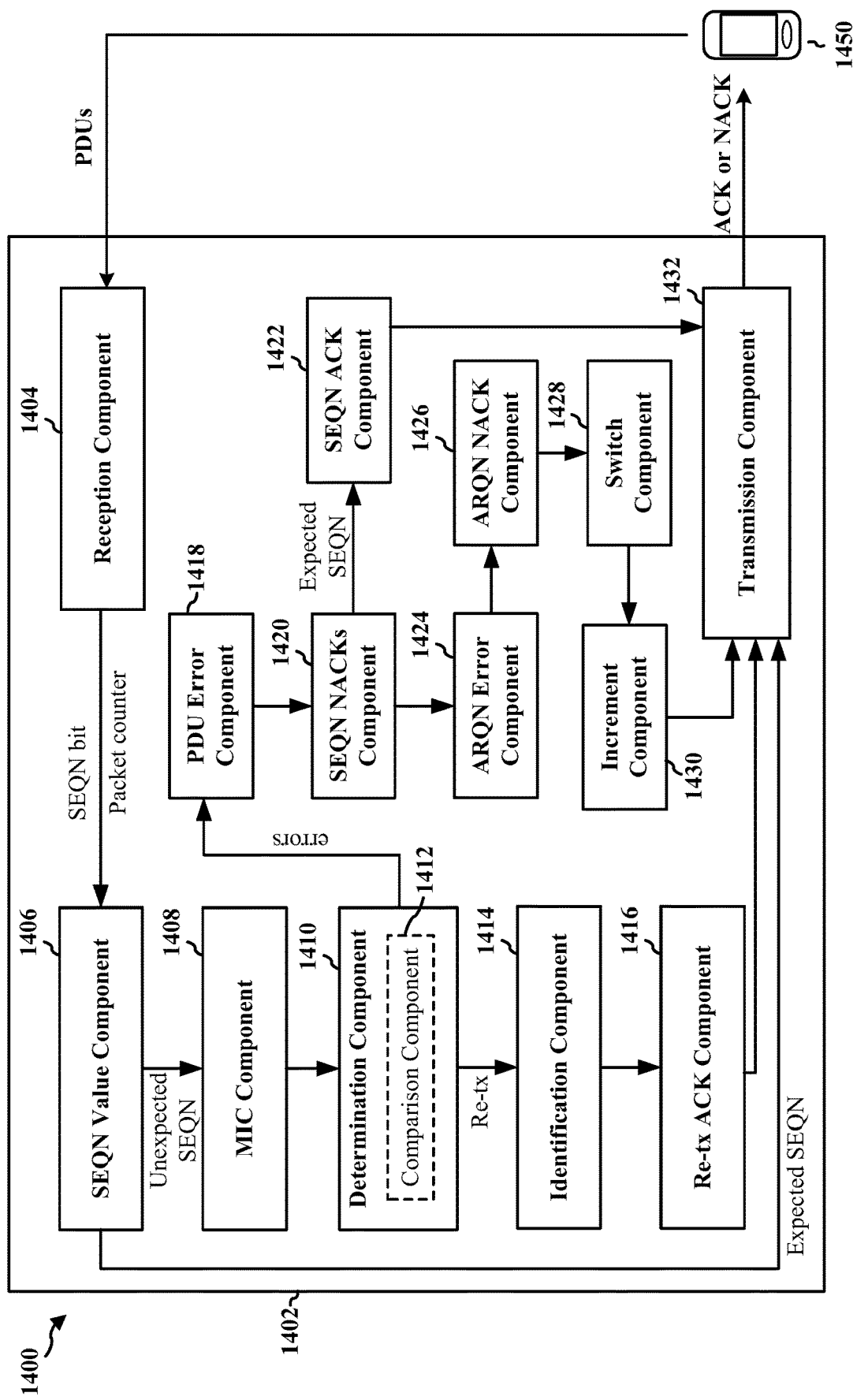
FIG. 14 is a conceptual data flow diagram illustrating the data flow between different means/components in an exemplary apparatus, in accordance with certain aspects of the disclosure.

FIG. 14 is a conceptual data flow diagram 1400 illustrating the data flow between different means/components in an exemplary apparatus 1402. The apparatus may be a second or slave device (e.g., the wireless device 102, peripheral device 104, 106, 110, 112, 114, wireless device 200, 802, 804, 902, 904, 1002, 1004, 1102, 1104, 1202, 1204) in wireless communication with a first or master device (e.g., the wireless device 102, peripheral device 104, 106, 110, 112, 114, wireless device 200, 802, 804, 902, 904, 1002, 1004, 1102, 1104, 1202, 1204, 1450).

The apparatus includes a reception component 1404 configured to receive one or more PDUs from a master device 1450, e.g., as described in connection with 1302 of FIG. 13. The one or more PDUs may comprise at least one of a SEQN bit or a packet counter value. The apparatus includes a SEQN value component 1406 configured to determine whether a value of the SEQN bit of the received first PDU may be an expected SEQN or an unexpected SEQN, e.g., as described in connection with 1304 of FIG. 13. The apparatus includes a MIC component 1408 configured to calculate, based on the packet counter value, a MIC of the received first PDU, e.g., as described in connection with 1308 of FIG. 13. The apparatus includes a determination component 1410 configured to determine whether the received first PDU is a re-transmission of a previous PDU or the received first PDU comprises errors, e.g., as described in connection with 1310 of FIG. 13. The apparatus may include a comparison component 1412 configured to determine whether at least undencrypted MIC octets of the first PDU match undencrypted MIC octets of the previous received PDU, e.g., as described in connection with 1312 of FIG. 13. The comparison component 1412 may be configured to determine whether CRC octets of the first PDU match CRC octets of the previous received PDU, e.g., as described in connection with 1314 of FIG. 13. The apparatus includes an identification component 1414 configured to identify the first PDU as the re-transmission of the previously received PDU when the undencrypted MIC octets, the CRC octets, or both of the first PDU match the undencrypted MIC octets, the CRC octets, or both of the previous received PDU, respectively, e.g., as described in connection with 1316 of FIG. 13. The apparatus includes a re-tx ACK component 1416 configured to transmit an ACK when the first PDU is determined to be the re-transmission of the previously received PDU, e.g., as described in connection with 1318 of FIG. 13. The re-tx ACK component 1416 may be configured to discard the first PDU when the first PDU is determined to be the re-transmission of the previously received PDU. The apparatus includes a PDU error component 1418 configured to identify the first PDU as a new PDU having errors, e.g., as described in connection with 1322 of FIG. 13. The new PDU having errors may be identified as having at least a SEQN bit error. The apparatus includes a SEQN NACKs component 1420 configured to transmit a maximum of N consecutive NACKs, with N≥0, or until the expected SEQN is successfully received, e.g., as described in connection with 1324 of FIG. 13. The apparatus includes a SEQN ACK component 1422 configured to transmit an ACK, when the expected SEQN is successfully received, after the transmission of at least one of the N consecutive NACKs, e.g., as described in connection with 1326 of FIG. 13. The apparatus includes an ARQN error component 1424 configured to determine the presence of an ARQN bit error when the expected SEQN is not successfully received after the N consecutive NACKs, e.g., as described in connection with 1328 of FIG. 13. The apparatus includes an ARQN NACK component 1426 configured to transmit a NACK in response to the identification of the first PDU as having the ARQN bit error, e.g., as described in connection with 1330 of FIG. 13. The apparatus includes a switch component 1428 configured to switch the value of the expected SEQN to an opposite value, e.g., as described in connection with 1332 of FIG. 13. The apparatus includes an increment component 1430 configured to increment the packet counter value by 1, e.g., as described in connection with 1334 of FIG. 13. The apparatus includes a transmission component 1432 configured to transmit signals (e.g., ACK or NACK) to a peer device (e.g., master or first device).

The apparatus may include additional components that perform each of the blocks of the algorithm in the aforementioned flowcharts of FIGS. 8-11. As such, each block in the aforementioned flowcharts of FIGS. 8-11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 15:
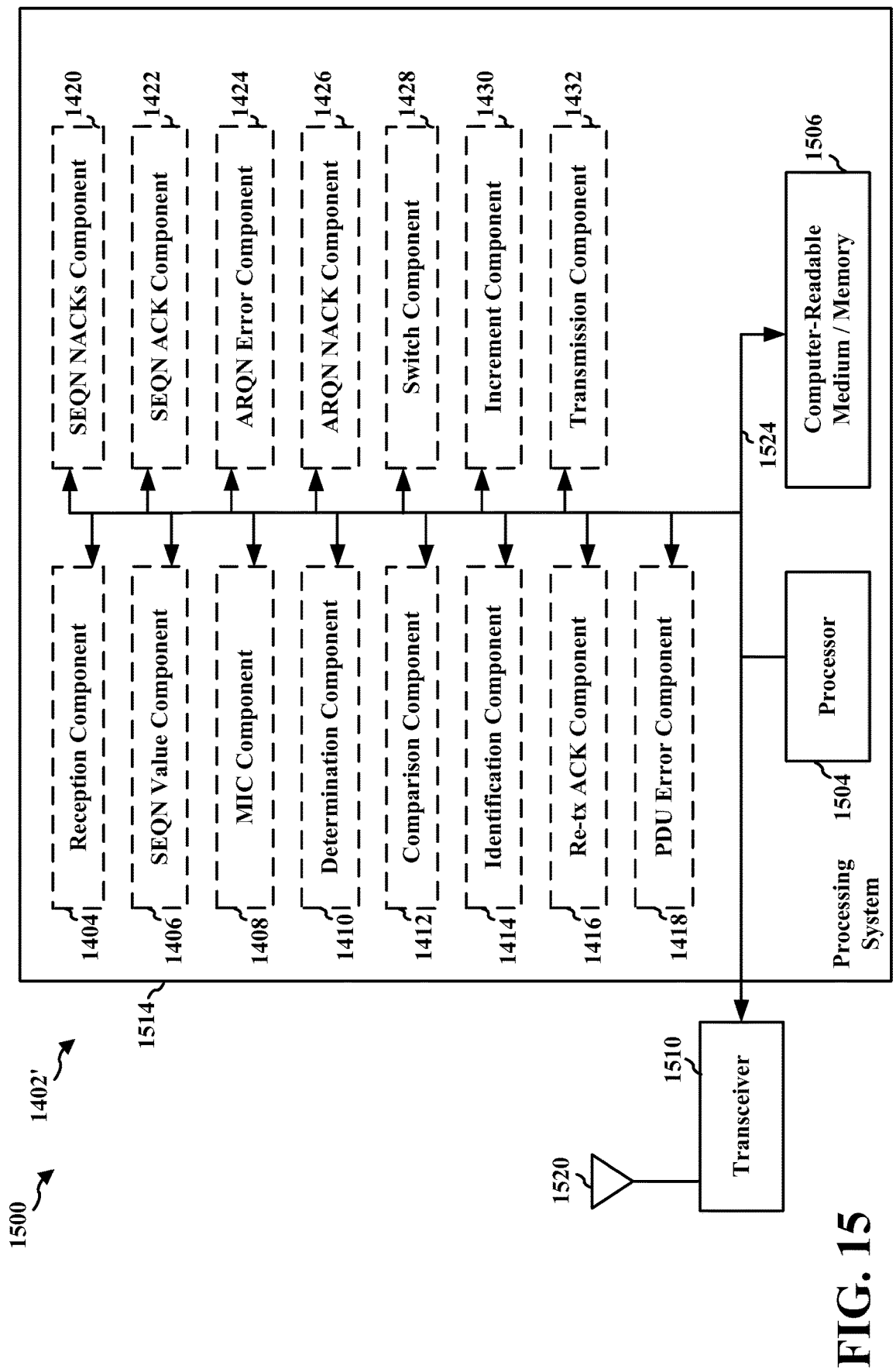
FIG. 15 is a diagram illustrating an example of a hardware implementation for an apparatus employing a processing system, in accordance with certain aspects of the disclosure.

FIG. 15 is a diagram 1500 illustrating an example of a hardware implementation for an apparatus 1402' employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware components, represented by the processor 1504, the components 1404, 1406, 1408, 1410, 1412, 1414, 1416, 1418, 1420, 1422, 1424, 1426, 1428, 1430, 1432, and the computer-readable medium/memory 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The transceiver 1510 receives a signal from the one or more antennas 1520, extracts information from the received signal, and provides the extracted information to the processing system 1514, specifically the reception component 1404. In addition, the transceiver 1510 receives information from the processing system 1514, specifically the transmission component 1432, and based on the received information, generates a signal to be applied to the one or more antennas 1520. The processing system 1514 includes a processor 1504 coupled to a computer-readable medium/memory 1506. The processor 1504 is responsible for general processing, including the execution of software stored on the computer-readable medium/memory 1506. The software, when executed by the processor 1504, causes the processing system 1514 to perform the various functions described supra for any particular apparatus. The computer-readable medium/memory 1506 may also be used for storing data that is manipulated by the processor 1504 when executing software. The processing system 1514 further includes at least one of the components 1404, 1406, 1408, 1410, 1412, 1414, 1416, 1418, 1420, 1422, 1424, 1426, 1428, 1430, 1432. The components may be software components running in the processor 1504, resident/stored in the computer readable medium/memory 1506, one or more hardware components coupled to the processor 1504, or some combination thereof.

In certain configurations, the apparatus 1402/1402' for wireless communication may include means for receiving a first PDU comprising at least one of a SEQN bit or a packet counter value. The apparatus may include means for determining whether a value of the SEQN bit of the received first PDU is an expected SEQN or an unexpected SEQN. The apparatus may include means for calculating, based on the packet counter value, a MIC of the received first PDU. The apparatus may include means for determining, based on the determination that the value of the SEQN bit is the unexpected SEQN, whether the received first PDU is a re-transmission of a previous PDU or the received first PDU comprising errors. The apparatus may include means for transmitting an ACK or a NACK in response to the determination of whether the first PDU is the re-transmission of the previous PDU or the first PDU comprising errors. The apparatus may further include means for determining whether at least undencrypted MIC octets of the first PDU match undencrypted MIC octets of the previous received PDU. The apparatus may further include means for determining whether CRC octets of the first PDU match CRC octets of the previous received PDU. The apparatus may further include means for identifying the first PDU as the re-transmission of the previously received PDU when the undencrypted MIC octets, the CRC octets, or both of the first PDU match the undencrypted MIC octets, the CRC octets, or both of the previous received PDU, respectively. The apparatus may further include means for transmitting an ACK and discarding the first PDU, when the first PDU is determined to be the re-transmission of the previously received PDU. The apparatus may further include means for identifying the first PDU as a new PDU having errors, when the first PDU is determined to not match any of the undencrypted MIC octets, the CRC octets of the previous received PDU, wherein the new PDU having errors is identified as having at least a SEQN bit error. The apparatus may further include means for transmitting a maximum of N consecutive NACKs, wherein N≥0, or until the expected SEQN is successfully received. The apparatus may further include means for transmitting, when the expected SEQN is successfully received, the ACK after the transmission of at least one of the N consecutive NACKs. The apparatus may further include means for determining the presence of an ARQN bit error when the expected SEQN is not successfully received after the N consecutive NACKs. Each of the N consecutive NACKs may comprise an ARQN bit to indicate that the corresponding packet was not properly received. The apparatus may further include means for transmitting a NACK in response to the identification of the first PDU as having the ARQN bit error. The apparatus may further include means for switching the value of the expected SEQN to an opposite value. The apparatus may further include means for incrementing the packet counter value by 1. The aforementioned means may be the processor(s) 202, the radio 230, the MMU 240, the WLAN controller 250/short-range communication controller 252/the WWAN controller 256, one or more of the aforementioned components of the apparatus 1402 and/or the processing system 1514 of the apparatus 1402' configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication, comprising:
receiving a first packet data unit (PDU) comprising at least one of a sequence number (SEQN) bit or a packet counter value;
determining whether a value of the SEQN bit of the received first PDU is an expected SEQN or an unexpected SEQN;
calculating, based on the packet counter value, a message integrity check (MIC) of the received first PDU;
determining, based on the determination that the value of the SEQN bit is the unexpected SEQN, whether the received first PDU is a re-transmission of a previous PDU or the received first PDU comprising errors;
transmitting an acknowledgement (ACK) or a negative acknowledgment (NACK) in response to the determination of whether the first PDU is the re-transmission of the previous PDU or the first PDU comprising errors; and
wherein determining whether the received first PDU is the re-transmission of the previous PDU comprises:
determining whether at least undencrypted MIC octets of the first PDU match undencrypted MIC octets of the previous received PDU.

2. The method of claim 1, further comprising:
determining whether CRC octets of the first PDU match CRC octets of the previous received PDU.

3. The method of claim 1, further comprising:
identifying the first PDU as the re-transmission of the previously received PDU when the undencrypted MIC octets, the CRC octets, or both of the first PDU match the undencrypted MIC octets, the CRC octets, or both of the previous received PDU, respectively; and
transmitting an ACK and discarding the first PDU, when the first PDU is determined to be the re-transmission of the previously received PDU.

4. The method of claim 1, further comprising:
identifying the first PDU as a new PDU having errors, when the first PDU is determined to not match any of the undencrypted MIC octets, the CRC octets of the previous received PDU, wherein the new PDU having errors is identified as having at least a SEQN bit error.

5. The method of claim 4, further comprising:
transmitting a maximum of N consecutive NACKs, wherein N≥0, or until the expected SEQN is successfully received.

6. The method of claim 5, further comprising:
transmitting, when the expected SEQN is successfully received, the ACK after the transmission of at least one of the N consecutive NACKs.

7. The method of claim 5, further comprising:
determining the presence of an automatic repeat request number (ARQN) bit error when the expected SEQN is not successfully received after the N consecutive NACKs, wherein each of the N consecutive NACKs comprise an ARQN bit to indicate that the corresponding packet was not properly received.

8. The method of claim 7, further comprising:
transmitting a NACK in response to the identification of the first PDU as having the ARQN bit error;
switching the value of the expected SEQN to an opposite value; and
incrementing the packet counter value by 1.

9. The method of claim 7, wherein the ARQN bit error occurs when a PDU preceding the first PDU was improperly received, and an ARQN bit of the resultant NACK was improperly received by a peer device, such that a next received PDU comprises a MIC failure and the value of the SEQN bit of the next received PDU does not match an expected SEQN.

10. An apparatus for wireless communication, comprising:
means for receiving a first packet data unit (PDU) comprising at least one of a sequence number (SEQN) bit or a packet counter value;
means for determining whether a value of the SEQN bit of the received first PDU is an expected SEQN or an unexpected SEQN;
means for calculating, based on the packet counter value, a message integrity check (MIC) of the received first PDU;
means for determining, based on the determination that the value of the SEQN bit is the unexpected SEQN, whether the received first PDU is a re-transmission of a previous PDU or the received first PDU comprising errors;
means for transmitting an acknowledgement (ACK) or a negative acknowledgment (NACK) in response to the determination of whether the first PDU is the re-transmission of the previous PDU or the first PDU comprising errors; and
wherein the means for determining whether the received first PDU is the re-transmission of the previous PDU is configured to:
determine whether at least undencrypted MIC octets of the first PDU match undencrypted MIC octets of the previous received PDU.

11. The apparatus of claim 10, further comprising:
means for determining whether CRC octets of the first PDU match CRC octets of the previous received PDU.

12. The apparatus of claim 10, further comprising:
means for identifying the first PDU as the re-transmission of the previously received PDU when the undencrypted MIC octets, the CRC octets, or both of the first PDU match the undencrypted MIC octets, the CRC octets, or both of the previous received PDU, respectively; and
means for transmitting an ACK and discarding the first PDU, when the first PDU is determined to be the re-transmission of the previously received PDU.

13. The apparatus of claim 10, further comprising:
means for identifying the first PDU as a new PDU having errors, when the first PDU is determined to not match any of the undencrypted MIC octets, the CRC octets of the previous received PDU, wherein the new PDU having errors is identified as having at least a SEQN bit error.

14. The apparatus of claim 13, further comprising:
means for transmitting a maximum of N consecutive NACKs, wherein N≥0, or until the expected SEQN is successfully received.

15. The apparatus of claim 14, further comprising:
means for transmitting, when the expected SEQN is successfully received, the ACK after the transmission of at least one of the N consecutive NACKs.

16. The apparatus of claim 14, further comprising:
means for determining the presence of an automatic repeat request number (ARQN) bit error when the expected SEQN is not successfully received after the N consecutive NACKs, wherein each of the N consecutive NACKs comprise an ARQN bit to indicate that the corresponding packet was not properly received.

17. The apparatus of claim 16, further comprising:
means for transmitting a NACK in response to the identification of the first PDU as having the ARQN bit error;
means for switching the value of the expected SEQN to an opposite value; and
means for incrementing the packet counter value by 1.

18. The method of claim 16, wherein the ARQN bit error occurs when a PDU preceding the first PDU was improperly received, and an ARQN bit of the resultant NACK was improperly received by a peer device, such that a next received PDU comprises a MIC failure and the value of the SEQN bit of the next received PDU does not match an expected SEQN.

19. An apparatus for wireless communication, comprising:
a memory; and
at least one processor coupled to the memory and configured to:
receive a first packet data unit (PDU) comprising at least one of a sequence number (SEQN) bit or a packet counter value;
determine whether a value of the SEQN bit of the received first PDU is an expected SEQN or an unexpected SEQN;
calculate, based on the packet counter value, a message integrity check (MIC) of the received first PDU;
determine, based on the determination that the value of the SEQN bit is the unexpected SEQN, whether the received first PDU is a re-transmission of a previous PDU or the received first PDU comprising errors;
transmit an acknowledgement (ACK) or a negative acknowledgment (NACK) in response to the determination of whether the first PDU is the re-transmission of the previous PDU or the first PDU comprising errors; and
wherein to determine whether the received first PDU is the re-transmission of the previous PDU, the at least one processor further configured to:
determine whether at least undencrypted MIC octets of the first PDU match undencrypted MIC octets of the previous received PDU.

20. The apparatus of claim 19, the at least one processor further configured to:
determine whether CRC octets of the first PDU match CRC octets of the previous received PDU.

21. The apparatus of claim 19, the at least one processor further configured to:
identify the first PDU as the re-transmission of the previously received PDU when the undencrypted MIC octets, the CRC octets, or both of the first PDU match the undencrypted MIC octets, the CRC octets, or both of the previous received PDU, respectively; and
transmit an ACK and discarding the first PDU, when the first PDU is determined to be the re-transmission of the previously received PDU.

22. The apparatus of claim 19, the at least one processor further configured to:
identify the first PDU as a new PDU having errors, when the first PDU is determined to not match any of the undencrypted MIC octets, the CRC octets of the previous received PDU, wherein the new PDU having errors is identified as having at least a SEQN bit error.

23. The apparatus of claim 22, the at least one processor further configured to:
transmit a maximum of N consecutive NACKs, wherein N≥0, or until the expected SEQN is successfully received.

24. The apparatus of claim 23, the at least one processor further configured to:
transmit, when the expected SEQN is successfully received, the ACK after the transmission of at least one of the N consecutive NACKs.

25. The apparatus of claim 23, the at least one processor further configured to:
determine the presence of an automatic repeat request number (ARQN) bit error when the expected SEQN is not successfully received after the N consecutive NACKs, wherein each of the N consecutive NACKs comprise an ARQN bit to indicate that the corresponding packet was not properly received.

26. The apparatus of claim 25, the at least one processor further configured to:
transmit a NACK in response to the identification of the first PDU as having the ARQN bit error;
switch the value of the expected SEQN to an opposite value; and
increment the packet counter value by 1.

27. A non-transitory computer-readable medium storing computer executable code, the code when executed by a processor cause the processor to:
receive a first packet data unit (PDU) comprising at least one of a sequence number (SEQN) bit or a packet counter value;
determine whether a value of the SEQN bit of the received first PDU is an expected SEQN or an unexpected SEQN;
calculate, based on the packet counter value, a message integrity check (MIC) of the received first PDU;
determine, based on the determination that the value of the SEQN bit is the unexpected SEQN, whether the received first PDU is a re-transmission of a previous PDU or the received first PDU comprising errors;
transmit an acknowledgement (ACK) or a negative acknowledgment (NACK) in response to the determination of whether the first PDU is the re-transmission of the previous PDU or the first PDU comprising errors; and
wherein determining whether the received first PDU is the re-transmission of the previous PDU comprises:
determining whether at least undencrypted MIC octets of the first PDU match undencrypted MIC octets of the previous received PDU.

\* \* \* \* \*